United States Patent
Okazawa et al.

(10) Patent No.: US 6,378,021 B1
(45) Date of Patent: Apr. 23, 2002

(54) SWITCH CONTROL METHOD AND APPARATUS IN A SYSTEM HAVING A PLURALITY OF PROCESSORS

(75) Inventors: Koichi Okazawa, Ebina; Toshiaki Tarui, Sagamihara; Yasuyuki Okada, Yamato, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/250,155

(22) Filed: Feb. 16, 1999

(30) Foreign Application Priority Data

Feb. 16, 1998 (JP) ............................................. 10-032560

(51) Int. Cl.⁷ ............................................. G06F 13/00
(52) U.S. Cl. ........................... 710/132; 710/104; 714/7; 714/13
(58) Field of Search ................................. 710/104, 131, 710/103, 126–132, 260, 38; 714/7–13; 370/228, 218, 247

(56) References Cited

U.S. PATENT DOCUMENTS

| | | | | |
|---|---|---|---|---|
| 5,129,077 A | | 7/1992 | Hillis | |
| 5,155,729 A | * | 10/1992 | Rysko et al. | 714/11 |
| 5,461,609 A | * | 10/1995 | Pepper | 370/218 |
| 5,485,604 A | * | 1/1996 | Miyoshi et al. | 714/10 |
| 5,636,341 A | * | 6/1997 | Matsushita et al. | 714/13 |
| 5,699,533 A | * | 12/1997 | Sakai | 710/131 |
| 5,949,982 A | * | 9/1999 | Frankeny et al. | 710/132 |
| 5,953,314 A | * | 9/1999 | Ganmukhi et al. | 370/220 |
| 6,035,414 A | * | 3/2000 | Okazawa et al. | 714/7 |
| 6,131,169 A | * | 10/2000 | Okazawa et al. | 714/7 |

FOREIGN PATENT DOCUMENTS

JP      06290067      10/1994

* cited by examiner

Primary Examiner—Christopher B. Shin
(74) Attorney, Agent, or Firm—Antonelli, Terry, Stout & Kraus, LLP

(57) ABSTRACT

In an information processing apparatus having a crossbar switch, registers are provided for logical division of a connection of the crossbar switch into a plurality of groups, in order to allow a system to change the group division configuration while the system is in an ordinary operation. As an application of this, in a hot standby system, when a fault occurs in an active partition and the active partition is replaced by a standby partition, the standby partition is allowed to include system resources used by the active partition such as CPU's and memories.

27 Claims, 15 Drawing Sheets

SWITCH CONTROL METHOD AND APPARATUS IN A SYSTEM HAVING A PLURALITY OF PROCESSORS

BACKGROUND OF THE INVENTION

1. Field of the Invention

The present invention relates to various types of computers such as a personal computer (PC), a work station (WS), a server machine, an office computer, a minicomputer, and a mainframe, and more particularly to an information processing apparatus for data transfer via a crossbar switch in a multiprocessor configuration.

2. Description of the Related Art

A tightly coupled multiprocessor configuration which shares a main storage is prevailing among server machines and high end PC and WS. Improvements on the performance and function of a data transfer system for connecting a plurality of CPU's, and a main storage, and a plurality of I/O devices are becoming an important issue. A configuration using crossbar switch connection is one of such data transfer system configurations. In a tightly coupled multiprocessor system, even if one CPU among a plurality of CPU's becomes defective, the whole system runs down. In order to improve the reliability of the whole system, the whole system is multiplexed by using a hot standby configuration or the like. Multiplication of the whole system uses a general method by which a plurality of systems are prepared and used as active and standby partition. For a configuration using crossbar switch connection, a method is known by which the connection of the crossbar switch is logically divided into a plurality of groups each group running as an independent system to provide both the active and standby partition in a single system. In any of the above methods, information necessary for exchange between the active and standby partition is stored in a non-volatile external storage device such as a hard disk.

The method by which a plurality of systems are prepared and used as active and standby partition is described, for example, in JP-A-7-60399. The method by which the connection of a crossbar switch is logically divided into a plurality of groups each group running as an independent system to provide both the active and standby partition in a single system is described, for example, in "Technical White Paper: The Ultra Enterprise 10000 Server"; Sun Microsystems, Inc.; 1997 (appearing on the home page of Sun Microsystems, Inc. in the USA: http://www.sun.com/). With the above-described method of conventional techniques by which the connection of a crossbar switch is logically divided into a plurality of groups each group running as an independent system, it is necessary to reboot the whole system in order for an individual system to change settings of the division configuration.

For a so-called massively parallel type multi-processor system, a method of improving the system reliability regarding a CPU failure is provided by which a defective CPU is logically disconnected from CPU's of a processor array and the system is dynamically reconfigured. Techniques regarding this are disclosed, for example, in U.S. Pat. No. 5,129,077.

With the conventional techniques for the above-described massively parallel multiprocessor system, a defective CPU is logically disconnected and the system is dynamically reconfigured. This method is based upon that each CPU constituting the massively parallel type multiprocessor system is provided with input/output interface compatible with the function described above. There arises therefore a problem that these techniques cannot be applied to server machines and high end PC and WS which use commercially available CPU's not compatible with such a function.

Conventional techniques used for server machines and high end PC and WS multiplex the whole system in order to improve the system reliability. For example, if the system is doubled, the cost is at least double if the method is incorporated by which a plurality of systems are prepared and used as active and standby partition. Also with the method by which the connection of a crossbar switch is logically divided into a plurality of groups and each system is provided with both the active and standby partition, it is necessary to reboot the whole system in order for an individual system to change settings of the group division configuration. Therefore, in order to avoid a reboot during an ordinary operation of the system, the system is required to exchange the active partition with a standby partition without changing the group division configuration. It is therefore necessary for the standby partition to prepare in advance all system resources other than the system resources of the active partition. Namely, the standby partition is required to prepare additional important system resources such as CPU's and a main storage having the same scale as those of the active partition. There arises therefore a problem that although the frame, power source and the like can be shared, the cost of the important system resources such as CPU's and a main storage is doubled so that the cost of the whole system becomes very high.

With the above-described conventional techniques by which the connection of a crossbar switch is logically divided into a plurality of groups, the system cannot change the group division configuration during the ordinary operation of the system. Therefore, if the system is to be provided with auxiliary system resources, each group is required to independently have the auxiliary system resources. There arises therefore a problem that the cost of the auxiliary system resources becomes high.

SUMMARY OF THE INVENTION

It is an object of the present invention: to suppress an increase in cost of an information processing apparatus having a crossbar switch configuration, such as servers and high end PC and WS, wherein each system changes the division configuration of groups without rebooting the whole system, and in a hot standby system, system resources used by an active partition are included in a standby partition when the active partition is exchanged with the standby system; and to improve a system reliability to a level equal to multiplication, i.e., to a level allowing to exchange an active partition with a standby partition of a scale equal to that of the active partition when a fault occurs in the active partition, while an increase of the cost is suppressed.

It is another object of the present invention to shorten an exchange time required for each system to change from an active partition to a standby partition in a hot standby system of information processing apparatus having a crossbar switch configuration.

It is another object of the present invention to provide a system having a plurality of groups with standby system resources capable of being included in an arbitrary group.

It is another object of the present invention to provide a multiprocessor system with a crossbar switch connection capable of changing the group division configuration during an operation of the system without rebooting the whole system.

In order to achieve the above objects of the invention, in an information processing apparatus with a crossbar switch connection, when the connection of the crossbar switch is logically divided into a plurality of groups, the apparatus changes the group division configuration without affecting the logical operation other than the operation of the crossbar switch of the apparatus. Namely, the logical division is set to registers in LSI constituting the crossbar switch, and the apparatus interrupts all transfers through busy control or the like in a sync state of the whole crossbar switch to thereby make the operation other than that of the crossbar switch stand and to change the setting in the registers of LSI during the interruption.

More specifically, according to the present invention, the apparatus has two sets of registers for setting the group configuration of logical division, and setting values of one of the two sets of registers are always used, and the values of the other set are neglected. The apparatus also has a change instruction register for instructing a change in the group configuration of logical division, and the apparatus changes the group configuration of logical division by selecting the setting values in one or the other of the two sets of registers, in the manner described below.

First, when data is written in the change instruction register, the crossbar switch notifies each port of a busy state to thereby instructs each port to interrupt a transfer and stand by. Each port therefore judges that the crossbar switch is busy and interrupts the transfer. The crossbar switch terminates all the transfers under processing, and synchronizes the whole crossbar switch. After this sync operation is completed, the crossbar switch selects the setting values in one or the other of the two sets of registers. In this manner, the division configuration of groups is changed. After the registers are selected, the crossbar switch instructs each port to allow to release the busy state and resume the transfer. Each port therefore judges that the crossbar switch is not busy, and resumes each transfer.

The above procedure of the invention is applied to a hot standby system having active and standby partition. When an active partition is exchanged with a standby partition because of a fault of the active partition, the system includes system resources such as CPU's and memories in the standby partition. More specifically, when an active partition is exchanged with a standby partition because of a fault of the active partition, the system resets the defective partition and changes the division configuration of groups while the system is in an ordinary operation to combine the active and standby partition in one group and include the reset system resources such as CPU's and memories used by the active partition in the standby partition. A scale of the standby system can therefore be expanded to a scale necessary for the operation of the standby system.

Further, according to the invention, a hot standby system having active and standby partition has a main storage shared by the active and standby partition, and information necessary for exchange between the partition is stored in the main storage.

Still further, according to the invention, since the system can change the division configuration of groups while the system in an ordinary operation, the system can be provided with standby system resources not belonging to any group, and can include the standby system resources in an arbitrary group as the division configuration of groups is changed when necessary.

DETAILED DESCRIPTION OF THE EMBODIMENTS

Embodiments of the present invention are illustrated in FIGS. 1 to 16. First, the system configuration will be described with reference to FIGS. 1 and 2.

Figure 1:
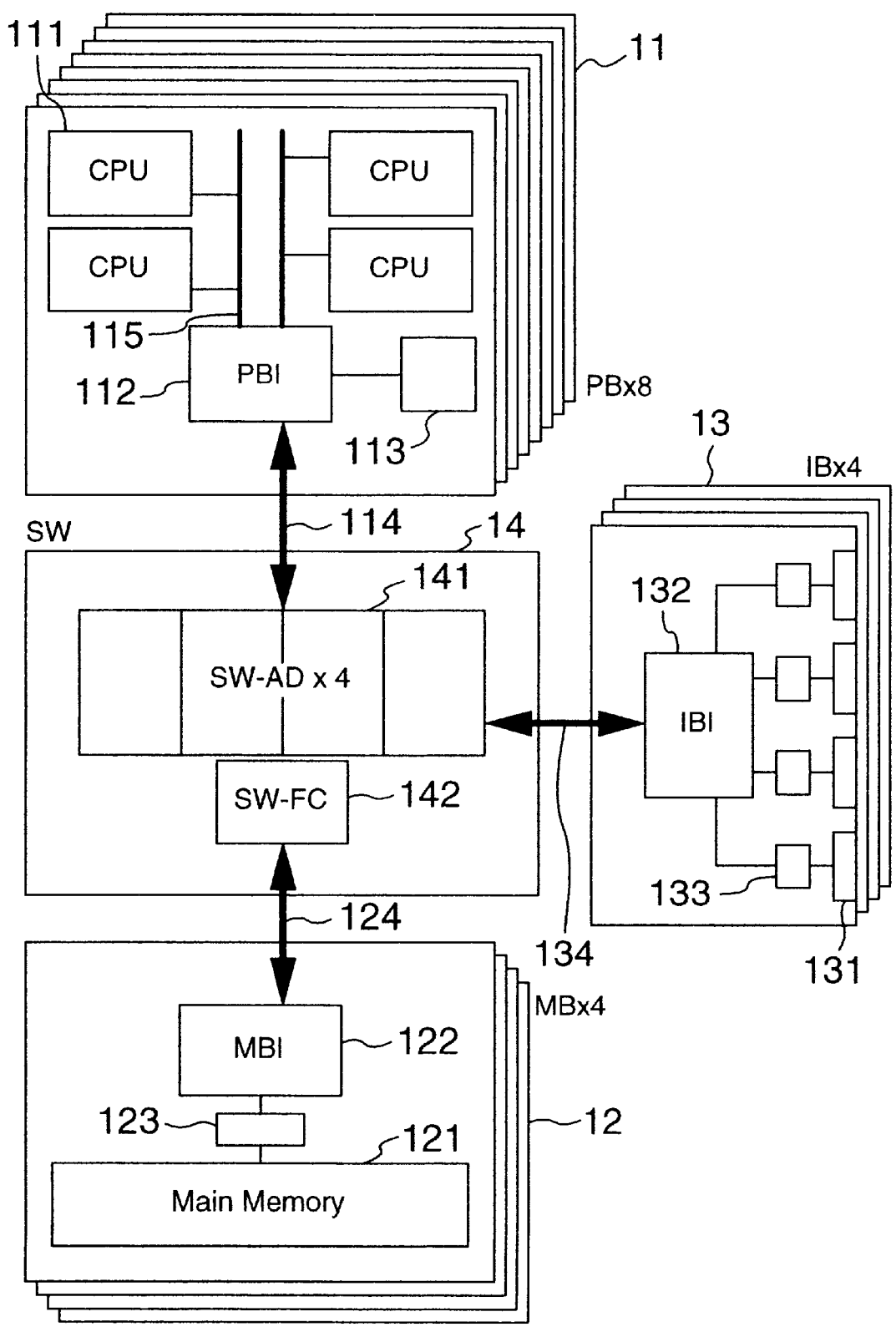
FIG. 1 is a diagram showing the hardware structure of a multiprocessor system embodying the present invention.

FIG. 1 is a diagram showing the hardware structure of a multiprocessor system embodying the present invention. Referring to FIG. 1, reference numeral 11 represents a plurality of processor boards (PB), reference numeral 12 represents a plurality of memory boards (MB), reference numeral 13 represents a plurality of I/O boards (IB), and reference numeral 14 represents a crossbar switch (SW). In FIG. 1, eight PB's, four MB's and four IB's are connected to SW having sixteen ports to constitute the multiprocessor system.

A plurality of CPU's 111 are mounted on each PB 11. A switch connection LSI (PB1) 112 controls CPU's 111 and a shared cache 113, and a connection interface connects PB 11 to SW14. In FIG. 1, although CPU's 111 and PBI are connected by a plurality of CPU busses 115, they may be connected by a single bus or switch. A system not having the shared cache memory 113 or a system having only a cache tag may also be used.

A main memory 121 is mounted on each MB 12. A switch connection LSI (MBI) 122 controls the main memory via a driver 123, and a connection interface 124 connects MB 12 and SW 14. A plurality of I/O connection interfaces 131 are mounted on each IB 13. A switch connection LSI (IBI) 132 controls the I/O interfaces via a driver 133, and a connection interface 134 connects IB 13 and SW 14.

In the system shown in FIG. 1, SW 14 has for each of 16 ports an address/data transfer path having an eight-byte width and function control signals as the connection interface. The address/data transfer path having the eight-byte width is sliced in the unit of two bytes (16 bits) to form a four-slice configuration, and is connected to four switching LSI's (SW-AD) 141. The function control signals are connected by a single function control LSI (SW-FC) 142. SW 14 is therefore constituted of five LSI's in total. The width of the address/data transfer path and the contents of the function control signal may change with each of the three types of connection interfaces 114, 124 and 134. The crossbar switch may be made of a single massively LSI (ULSI). The present invention is also applicable to this case.

Figure 2:
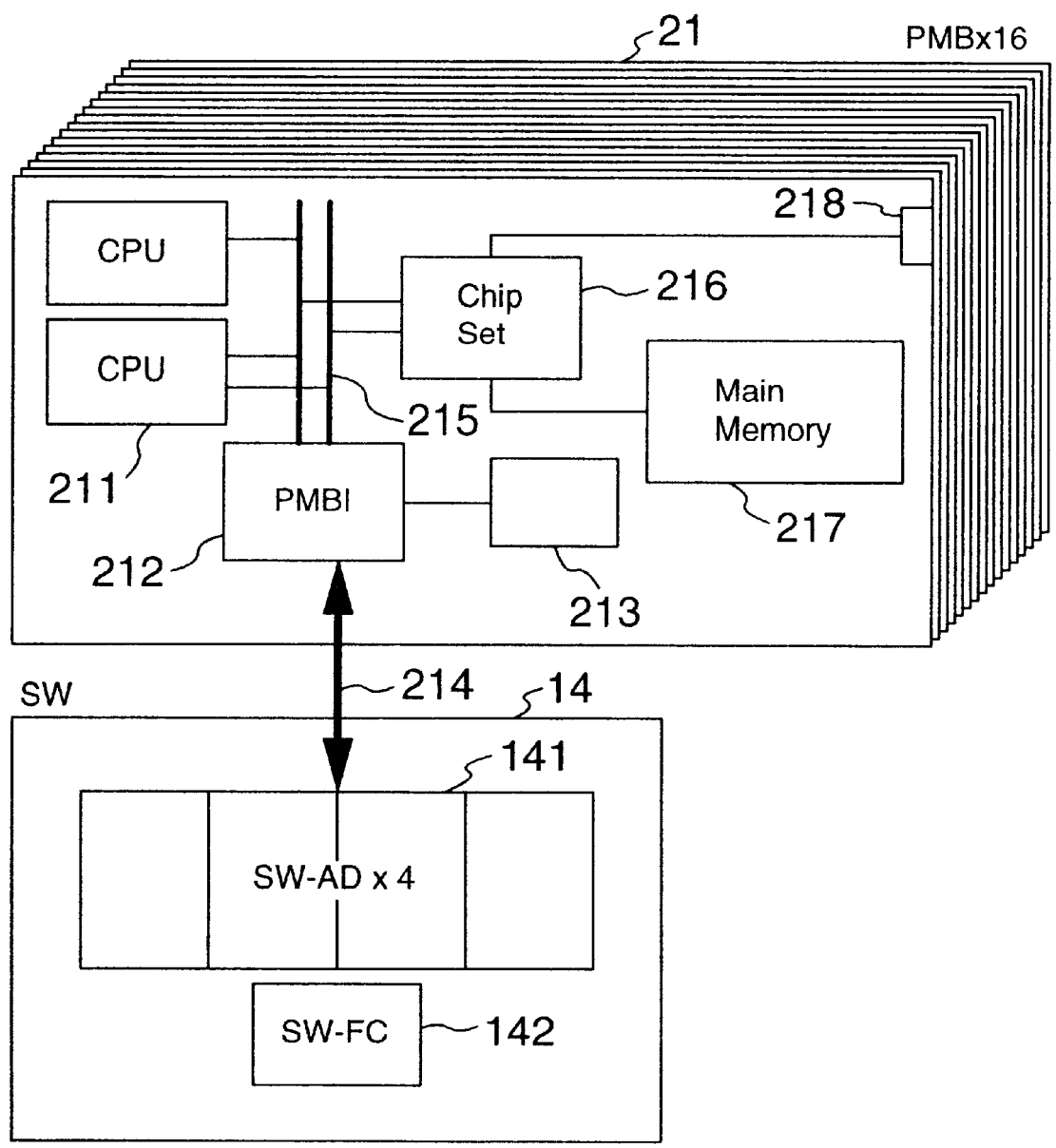
FIG. 2 is a diagram showing the hardware structure of another multiprocessor system embodying the present invention.
Figure 4:
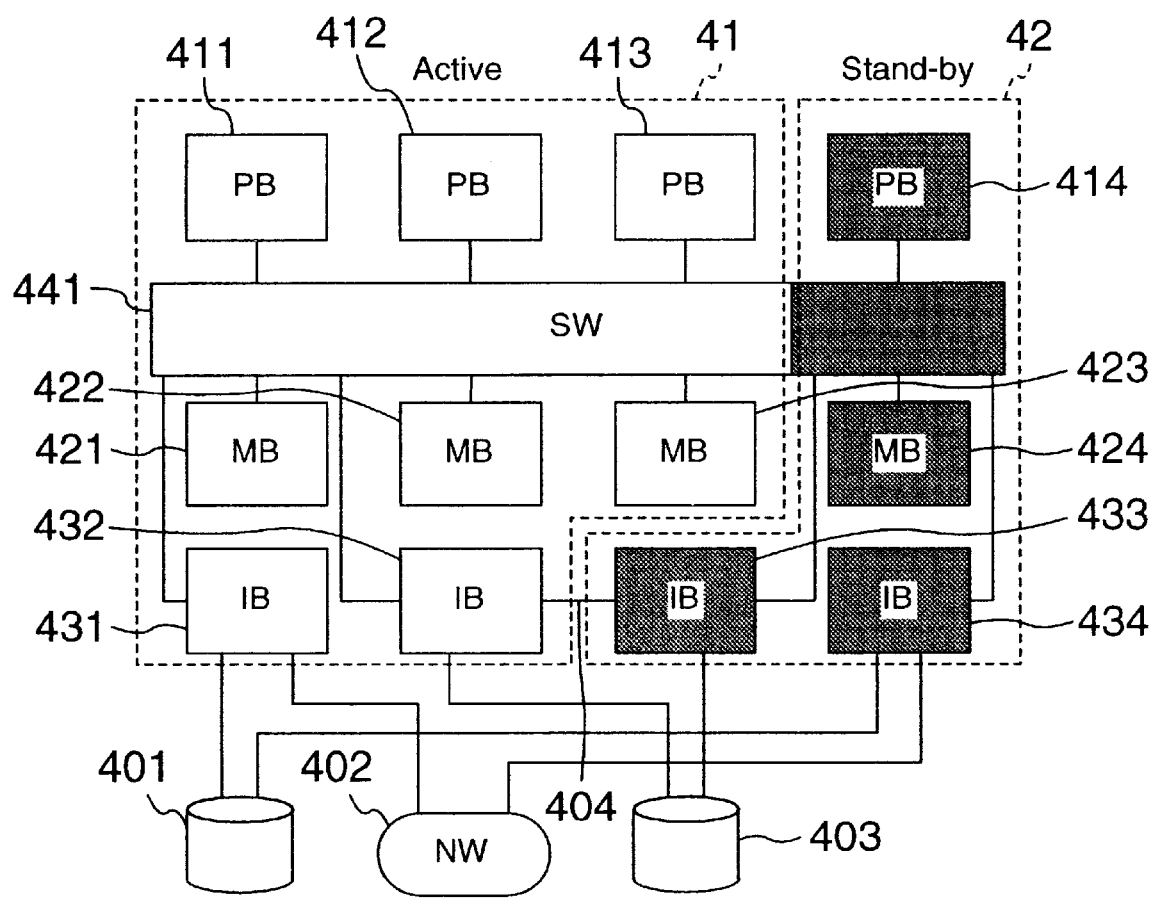
FIG. 4 is a diagram showing the configuration of a hot standby system of the invention.

FIG. 2 is a block diagram showing the hardware structure of another multiprocessor system embodying the present invention. Referring to FIG. 2, reference numeral 21 represents a plurality of processor memory boards (PMB) 21 and reference numeral 14 represents a crossbar switch (SW). The multiprocessor system shown in FIG. 4 is configured by connecting sixteen PMB's to SW having sixteen ports. PMB 21 has a structure same as an ordinary multi-processor PC.

Mounted on each PMB 21 are a plurality of CPU's 211, a PC control chip set 216, a main memory 217, and an I/O connection interface 218. Each of these components has the structure same as an ordinary multiprocessor PC. A switch connection LSI (PMBI) 212 controls a plurality of CPU's 211 and a shared cache memory 213, and a connection interface 214 connects PMB 21 and SW 14. SW 14 shown in FIG. 2 has quite the same structure as that of SW 14 shown in FIG. 1. The configurations shown in FIGS. 1 and 2 are similar to a well-known system configuration excepting SW and the SW connection interface.

Figure 12:
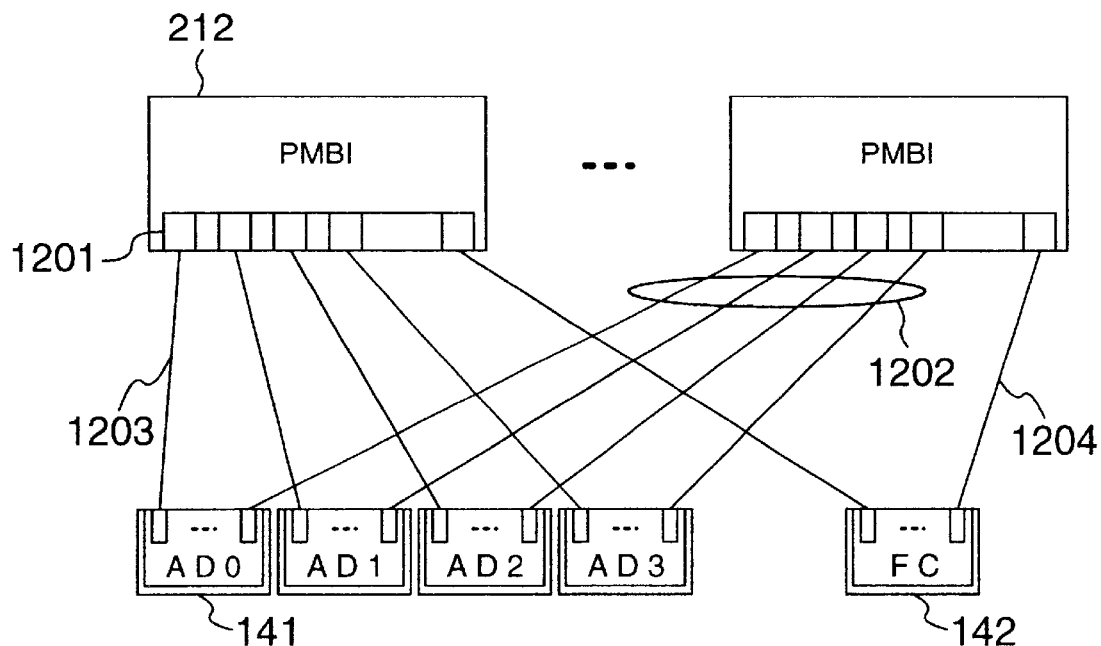
FIG. 12 is a diagram showing a connection of input/output ports of a crossbar switch of an information processing apparatus according to the invention.

FIG. 12 shows a connection structure of the crossbar switch to I/O ports in the system configurations shown in FIGS. 1 and 2, and FIG. 12 takes as an example the configuration of FIG. 2. Referring to FIG. 12, reference numeral 141 represents SW-AD, reference numeral 142 represents SW-FC, reference numeral 212 represents PMB1, reference numeral 1201 represents an I/O port connection interface of PMBI, reference numeral 1202 represents an address/data transfer path having an n-bit width, reference numeral 1203 represents an m-bit unit slice of the address/data transfer path, and reference numeral 1204 represents a function control signal. SW has for each of the plurality of ports an address/data transfer path having an 8-byte width and function control signals as the connection interface. At each port, the I/O port connection interface 1201 of PMBI 212 is connected to all the address/data transfer paths 1202 having the eight-byte width and all the function control signals 1204. On the SW side, the address/data transfer path 1202 having the 8-byte width is sliced in the unit of two bytes (16 bits) to form each slice 1203. In a similar manner, all ports are connected in a four-slice configuration to four switching LSI's (SW-AD) 141. The function control signals for all ports are connected to a signal function control LSI (SW-FC) 142. The crossbar switch may be configured by a single ULSI. The invention is also applicable to this case.

FIG. 3 illustrates the structure and operation of a hot standby system obtained during the course the invention was realized.

Figure 3A:
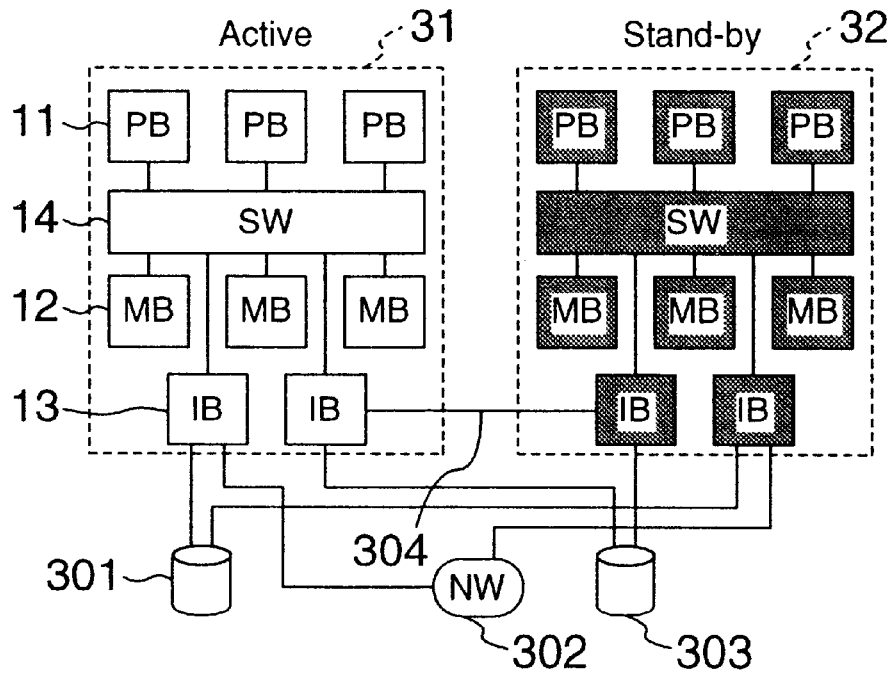
FIGS. 3A and 3B are diagrams showing the hardware structure of a hot standby system obtained during the course the present invention was realized.

FIG. 3A shows the configuration of a hot standby system having two systems. In FIG. 3A, reference numeral 31 represents an active partition system wherein three PB's 11, three MB's 12, and two IB's 13 are connected to SW 14. In this system, it is necessary to prepare a standby partition system 32 having the same configuration as that of the active partition system 31. Both the active partition system 31 and standby partition system 32 are connected to an active partition hard disk 301, a network 302 and a standby partition hard disk 303. The active partition system 31 and standby partition system 32 are connected together by an intersystem connection interface 304. The intersystem connection interface 304 is generally used for transfer of a heartbeat message, a system reset command, a reboot command, and the like.

During an ordinary operation, the active partition 31 operates by using the active partition hard disk 301 and network 302, whereas the standby partition 32 operates using the standby partition hard disk 303. The active partition 31 and standby partition 32 are connected by the intersystem connection interface 304, and transfer a heartbeat message therebetween to monitor each other the operation state.

When a fault occurs in the active partition 31 and the standby partition 32 detects this from a halt of the heartbeat message, an abnormal state notice, or the like, the partition 32 sends a system reset command to the partition 31 which is then reset. After the partition 31 is reset and the hard disk 301 and network 302 are disconnected from the partition 31, the partition 32 is connected to the hard disk 301 and network 302 and starts operating as an active partition. Thereafter, the partition 31 is rebooted to perform a self-diagnosis and necessary repairs, and thereafter the partition 31 is operated as a standby system or resumes the active partition operation through a general turn over process.

Figure 3B:
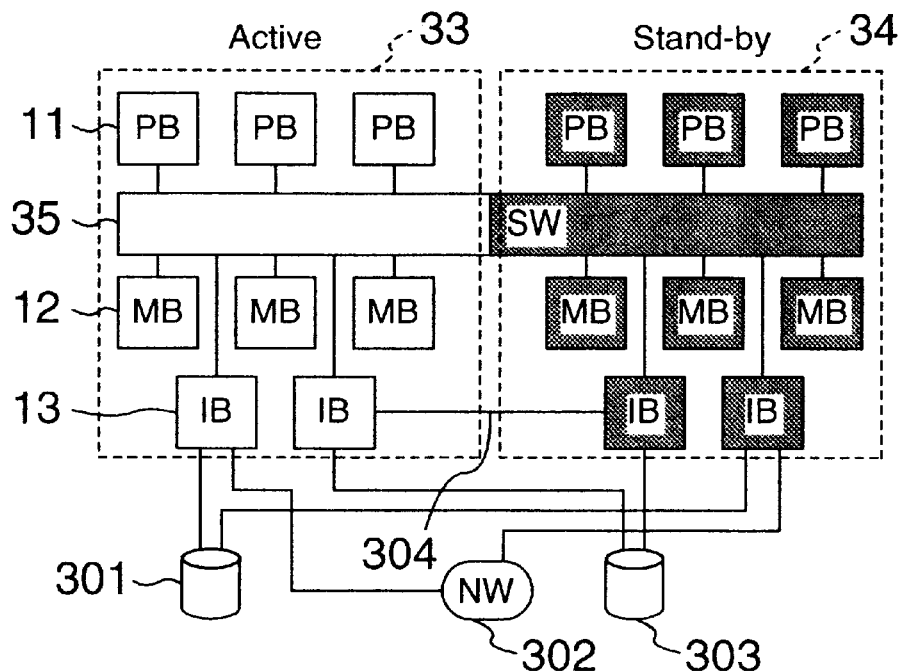

FIG. 3B shows the configuration of a hot standby system wherein the connection of a crossbar switch is logically divided into a plurality of groups and one system is provided with both the active and standby partition. In this case, the system is divided into an active partition group 33 and a standby partition group 34 through logical division of a crossbar switch 35. The system operation is quite the same as the operation of the system shown in FIG. 3A. In the system shown in FIG. 3A, grouping through the logical division of the crossbar switch 35 can be performed only while the operation of the whole system including both the partition 33 and 34 is stopped. Therefore, in a hot standby system which requires that at least one system operates always, the standby partition 34 is required to have system resources of the same scale as the active partition 33.

FIGS. 4 and 5 illustrate the structure and operation of a hot standby system according to the invention.

FIG. 4 shows the configuration of a hot standby system according to the invention. In FIG. 4, reference numeral 41 represents an active partition group in which three PB's 11, two MB's 12, and two IB's 13 are connected to SW 14. A standby partition group 42 has one PB 11, one MB 12, and two IB's 13 respectively connected to SW 14. This standby partition group 42 has the minimum structure necessary for the operation thereof. Both the active partition group 41 and standby partition group 42 are connected to an active partition hard disk 401, a network 402, and a standby partition hard disk 403. Similar to that shown in FIG. 3, the active partition 41 and standby partition 42 are connected by an intersystem connection interface 404.

Figures 5A, 5B, 5C:
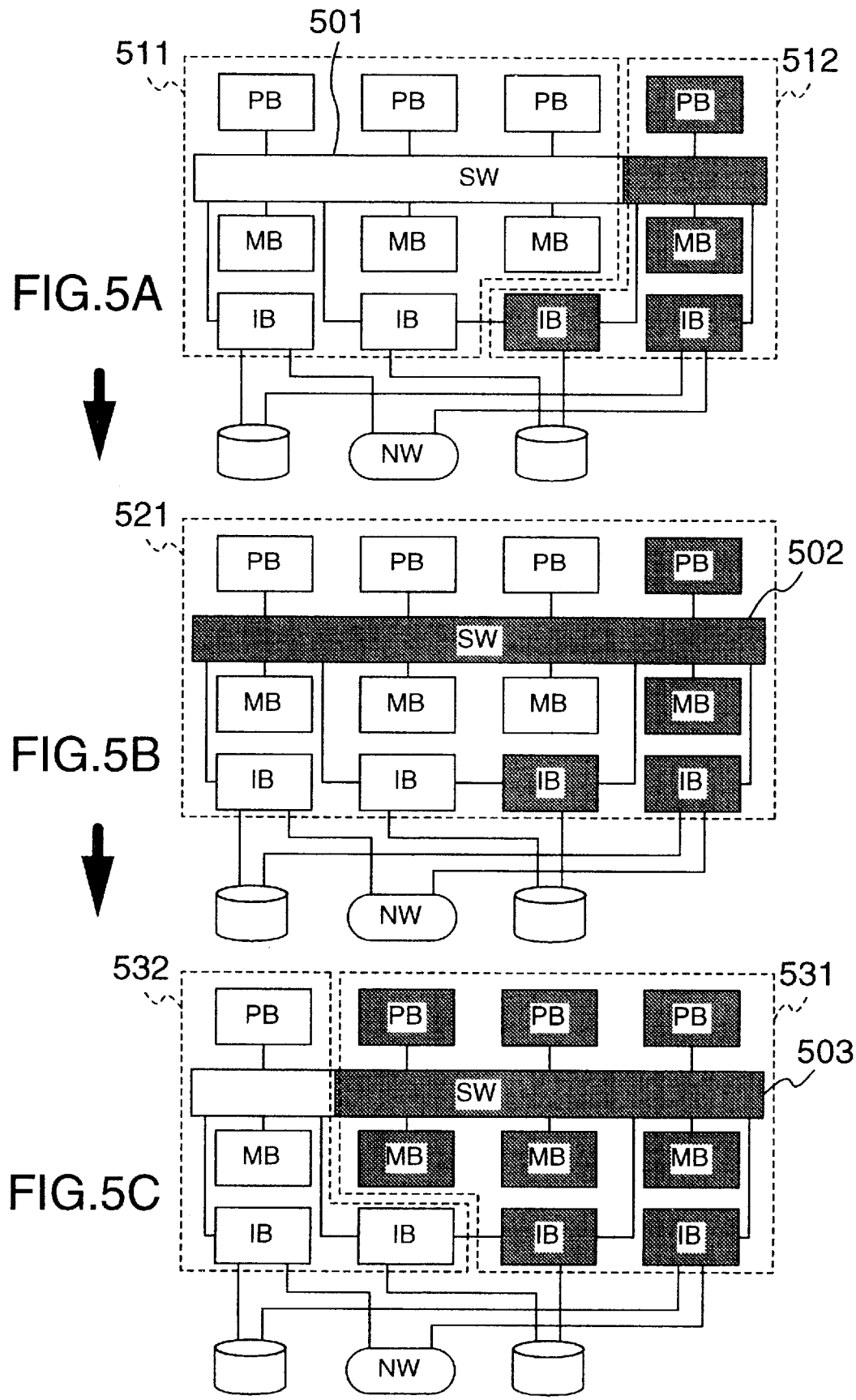
FIGS. 5A to 5C are diagrams showing a change in the configuration of the hot standby system of the invention during an exchange operation.

FIG. 5A is the same as FIG. 4 and illustrates an ordinary operation of an active partition group 511 and a standby partition group 512 both logically divided by a crossbar switch 501. When a fault occurs in the partition 511 and the standby partition 512 detects this from a halt of a heartbeat message, an abnormal state notice, or the like, the partition 512 sends a system reset command to the partition 511 which is then reset. After the partition 511 is reset, the partition 512 operates as an active partition in place of the partition 511. In this case, SW 512 changes the group configuration of logical division by a method to be described later, while the partition 512 is operated, to thereby change the state of the system to that shown in FIG. 5B.

In the state shown in FIG. 5B, the whole system constitutes one group because of a connection by SW 502.

In this state, PB's, MB's and IB's contained in the partition 511 shown in FIG. 5A are reset. The partition 512 shown in FIG. 5A becomes a partition 521 which diagnoses the reset PB's and MB's. If PB's and MB's have no problem, they are included in the partition 521 to thereby make the scale of the partition 521 have the same scale as the partition 511 shown in FIG. 5A. In this manner, the partition 521 can operate as an active partition having the performance equivalent to that of the partition 511 shown in FIG. 5A. Thereafter, SW 502 changes the group configuration of logical division while the partition 521 operates, to thereby change the state of the system to that shown in FIG. 5C.

In the state shown in FIG. 5C, the partition 521 expanded its scale is divided into a partition 531, and the remaining partition of the system becomes a partition 532. The partition 532 has a scale same as that of the partition 512 shown in FIG. 5A. Thereafter, the partition 532 is rebooted to perform a self-diagnosis and necessary repairs and to thereafter operate as a standby partition.

As compared to the system shown in FIG. 3, the standby partition shown in FIG. 4 is sufficient if it has the minimum system resources necessary for the operation thereof, whereas the standby partition shown in FIG. 3 is required to have system resources of the scale same as that of the active partition. Accordingly, while the invention suppresses an increase in the cost, it improves the system reliability to a level equal to multiplication, i.e., to a level allowing to exchange the active partition with a standby partition of a scale equal to that of the active partition when a fault occurs in the active partition.

Figure 6A:
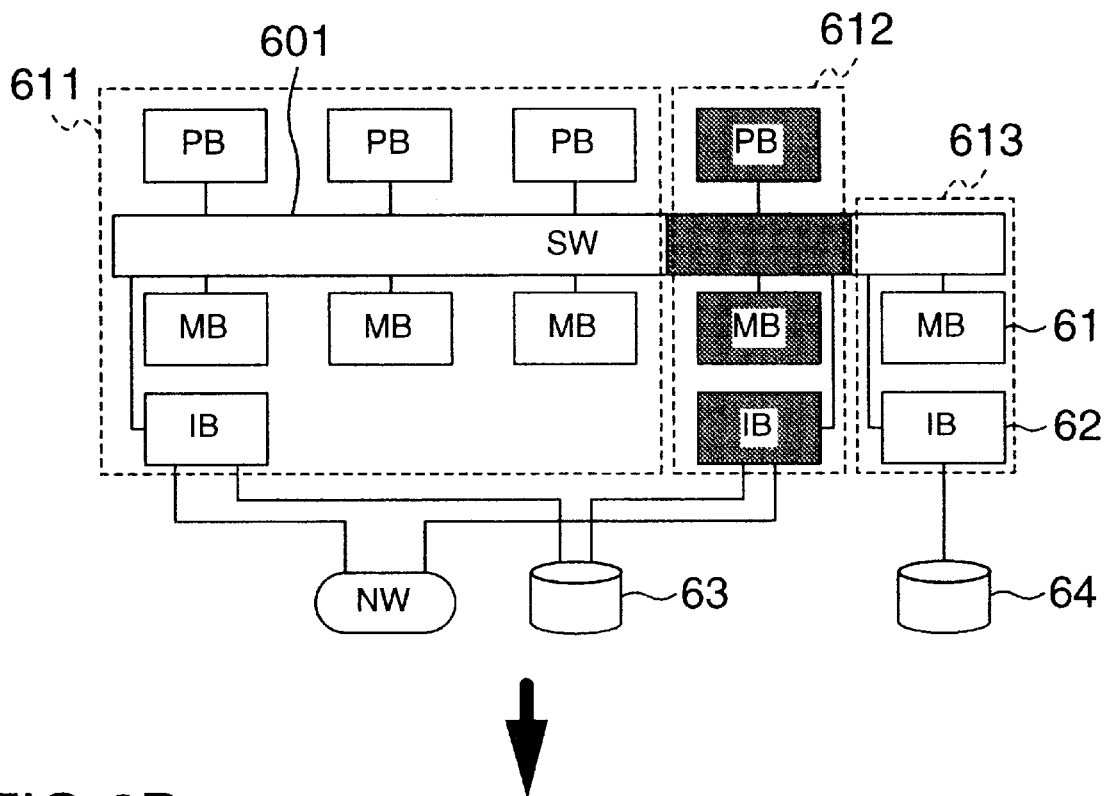
FIGS. 6A and 6B are diagrams showing a change in the configuration of another hot standby system of the invention during an exchange operation.

FIG. 6 illustrates the structure and operation of another hot standby system according to the invention. As shown in FIG. 6A, the system is divided into three groups including an active partition group 611, a standby partition group 612 and a shared group 613, respectively connected to SW 601. The shared group 613 has a shared MB 61 and a shared IB 62 which can be accessed from both the partition 611 and 612 through the connection of SW 601. In this example, the active partition 611 can continue its operation even if a fault occurs in the shared group 613. Reference numeral 63 represents an active partition hard disk, and reference numeral 64 represents a standby partition hard disk. The active partition 611 and standby partition 612 monitor each other the operation state by transferring the heartbeat message therebetween by using MB 61 of the shared group 613. Information necessary for exchange between the active and standby partition is generally stored in hard disks 63 and 64. In the system shown in FIG. 6, the same information is also stored in MB 61.

Figure 6B:
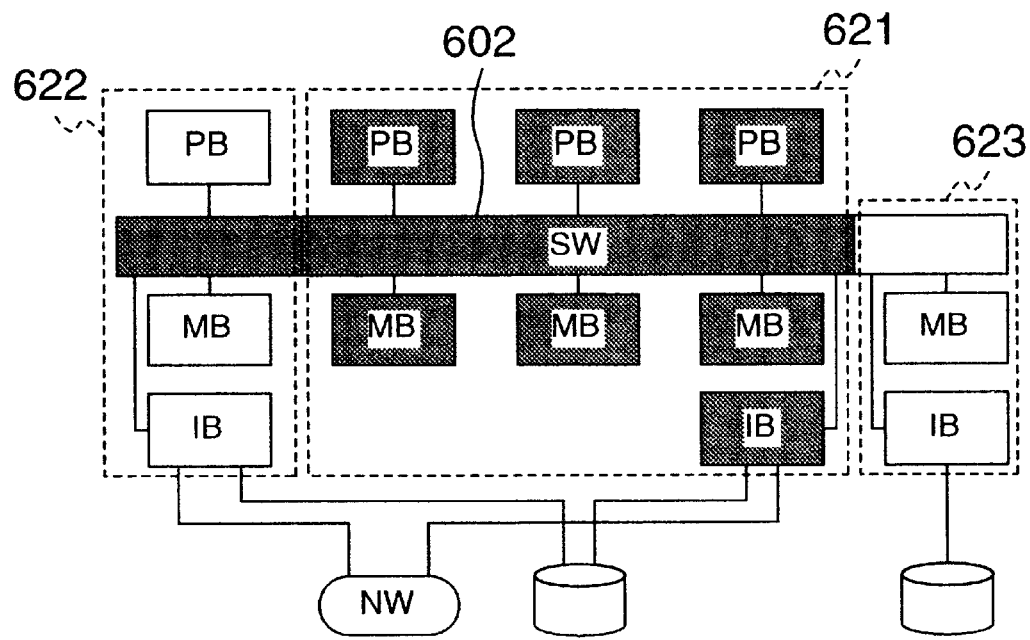

In the state shown in FIG. 6A, when a fault occurs in the active partition 611, the system changes its state to that shown in FIG. 6B under the control similar to that described with FIG. 5. In the state shown in FIG. 6B, the system is divided into an active partition 621, a standby partition 622 and a shared group 623 through the connection of SW 602. With this system, the information necessary for the partition exchange stored in MB 61 can be used when the system changes its state from FIG. 6A to FIG. 6B. Therefore, the partition exchange time can be shortened considerably as compared to the ordinary case where the information stored in the hard disks 63 and 64 is utilized.

In this embodiment, the shared group is set through the connection of SW. If SW supports a group division protocol using an address space or the like, the shared group may be set to a portion of system resources connected as the standby partition group. In this case, after the partition exchange, the shared group is set again in the system resources of the exchanged standby partition group.

A software control procedure for the exchange operation of the hot standby system of this invention described with FIG. 5 will be described with reference to FIG. 7. When a fault occurs in an active partition A during an ordinary operation (71), the active partition is reset upon reception of an instruction from a standby partition which detected the fault (72). Next, the partition B acted as the standby partition starts an active partition operation (73). A time required from Step 71 to Step 73 is generally called a partition exchange time. The procedure up to this is the same as the control procedure of a hot standby system according to conventional techniques.

Next, after the connection configuration of SW is changed (74), the reset system resources of the partition A are connected to the partition B which diagnoses the reset system resources, and if there is no problem, the system resources are included in the own partition B to thereby expand the scale of the own partition B to that of the active partition during the ordinary operation (75).

Next, after the connection configuration of SW is again changed (76), the remaining resources not included in the partition B are left in the partition A which is divided being inclusive of the remaining resources. Thereafter, the partition A is rebooted (77) to perform a self-diagnosis and necessary repairs and to thereafter start a standby partition operation. In this manner, the system recovers the ordinary operation. Step 77 is the same as that of the control procedure of a hot standby system according to conventional techniques.

Figure 7:
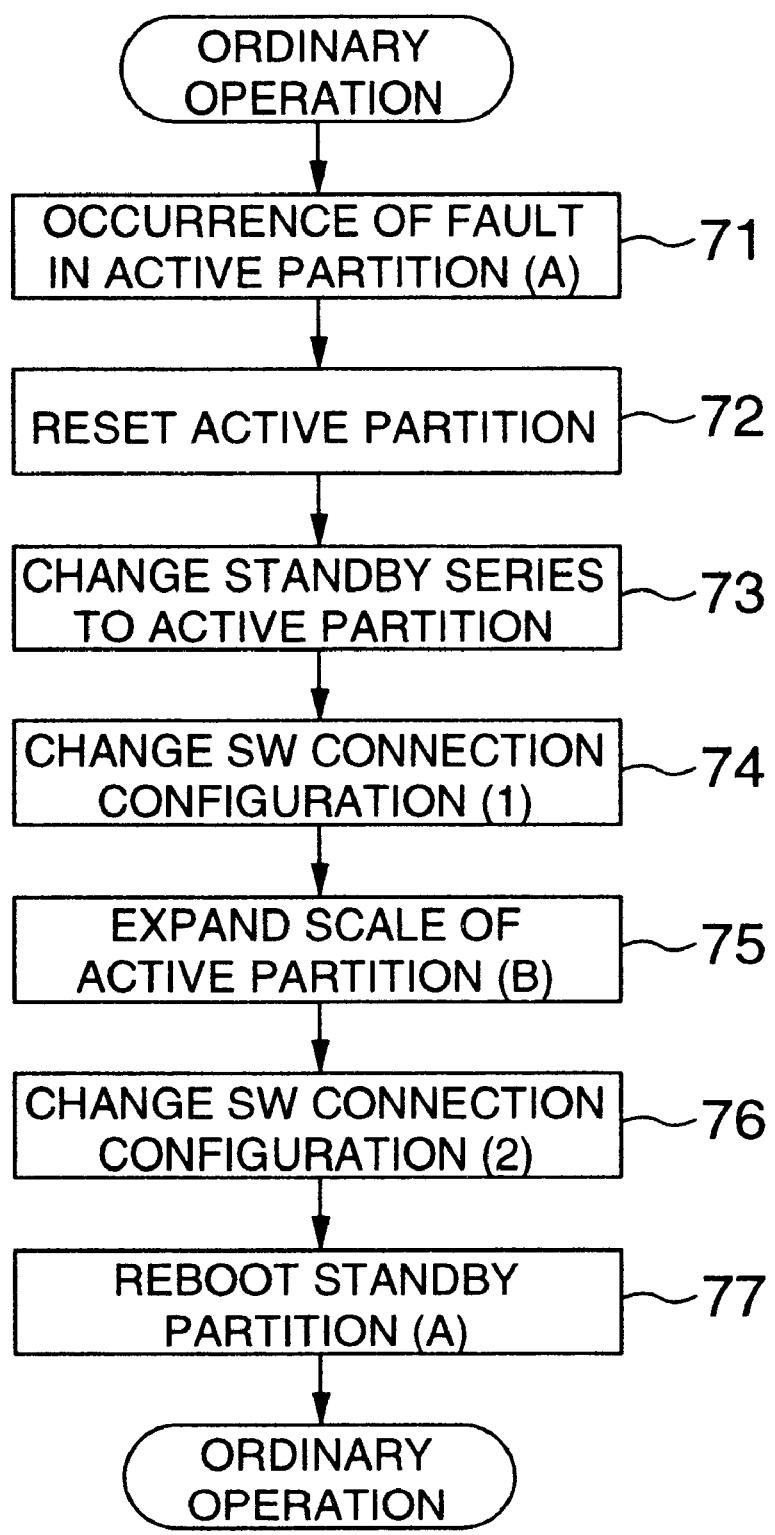
FIG. 7 is a flow chart illustrating an exchange operation of the host standby system of the invention.

At Steps 74 and 76 shown in FIG. 7, it is necessary to change the configuration of logical division of the crossbar switch SW while the active partition operates. This function is not realized by conventional techniques and essential requirements of the present invention. Examples of the structure and operation procedure of SW allowing such a function will be described with reference to FIGS. 8 to 10.

Figure 8:
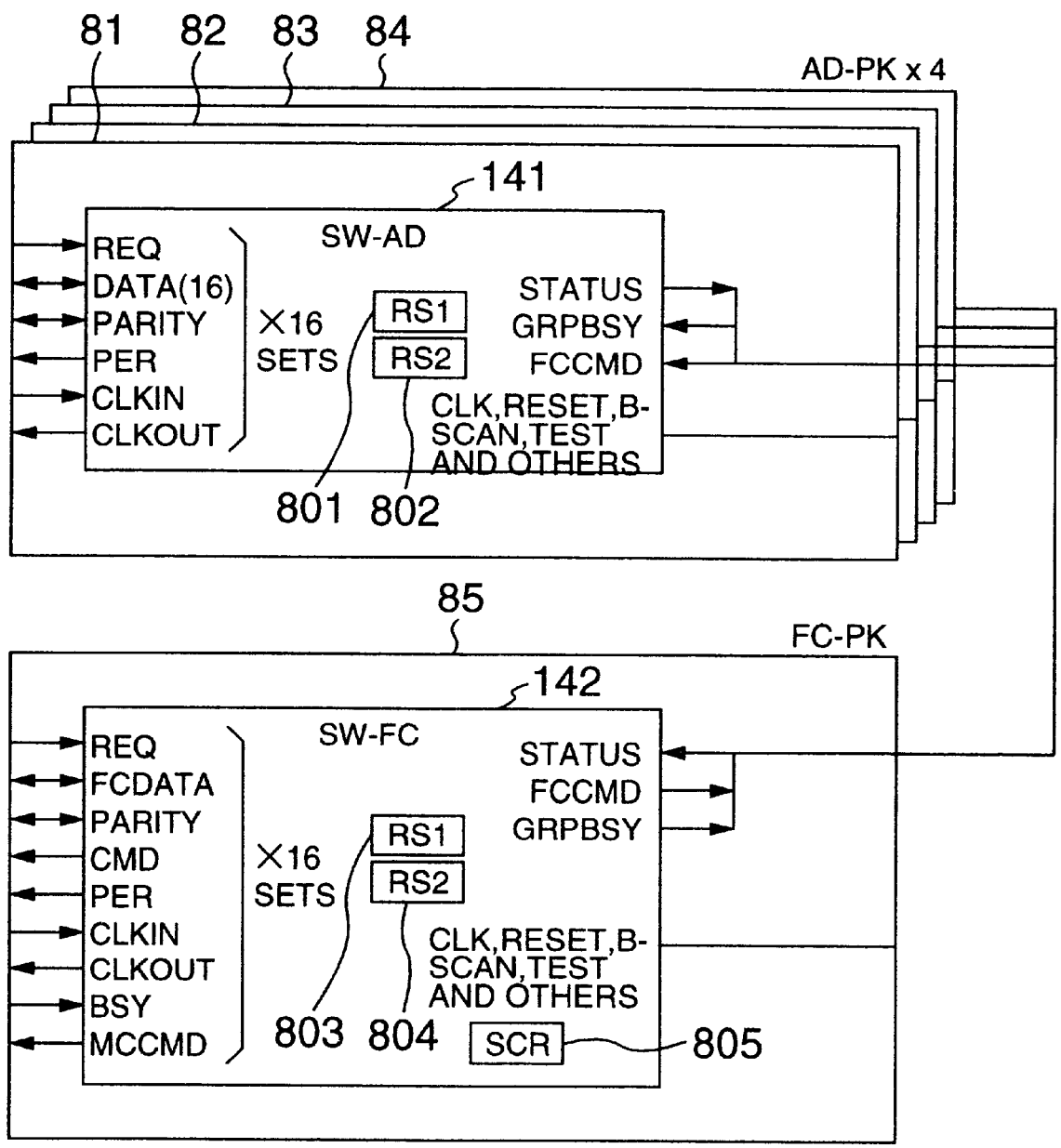
FIG. 8 shows LSI input/output signals of a crossbar switch of an information processing apparatus of the invention.

Referring to FIG. 8, reference numerals 141 and 142 denote the same components as those shown in FIG. 1, reference numerals 81 to 84 represent substrates (AD-PK) of SW-AD 141, and reference numeral 85 represents a substrate of SW-FC 142. Each LSI has an interface for general LSI control signals such as a control clock (CLK), a reset (RESET), a boundary scan (B-SCAN), and a test signal (TEST), and all LSI's are synchronous with CLK.

Each of sixteen ports of SW-AD 141 is connected to signals including a transfer request (REQ) from each port, a slice (DATA) of the address/data transfer path having two bytes (16 bits), a parity (PARITY) of the slice, a parity error notice (PER), a transfer clock input (CLKIN) and a transfer clock output (CLKOUT), and there are sixteen sets of these signals. In this example, a bi-directional transfer path is used for data and parity, and the clock input and output are prepared for expected source synchronous transfer or expected source sync transfer. The kinds of these signals depend upon the protocol of the crossbar switch.

SW-AD 141 is also connected as an interface to SW-FC, with various signals including a function control command (FCCMD), a status report for FCCMD, and a transfer suppression command for a busy state. The kinds of these signals depend upon the protocol of the crossbar switch.

Each of sixteen ports of SW-FC 142 is connected to signals including a transfer request (REQ) from each port, function control data (FCDATA), a parity (PARITY) for FCDATA, a function control command (CMD), a parity error notice (PER), a transfer clock input (CLKIN) and a transfer clock output (CLKOUT), and there are sixteen sets of these signals. In this example, a bi-directional transfer path is used for data and parity, and the clock input and output are prepared for expected source sync transfer. The kinds of these signals depend upon the protocol of the crossbar switch.

SW-FC 142 also has an interface signal to SW-AD, and a transfer suppression request (BSY) for a busy state and a machine check command (MCCMD) as the interface signals to each port. The kinds of these signals depend upon the protocol of the crossbar switch.

SW-AD 141 and SW-FC 142 each have register sets for storing a group configuration through logical division. Any CPU can set the contents of each register set. SW-AD 141 and SW-FC 142 perform a logical division operation in accordance with the set values in each resister set.

In this embodiment, SW-AD 141 and SW-FC 142 each have a register set RS1 (801, 803) and a resister set RS2 (802, 804) for storing the group configuration through logical division. Only one of the register sets is always used in common by LSI's and the setting values in the other are neglected. Only SW-FC 142 has an exchange instruction register SCR 805 to be later described. These registers are essential requirements of the invention for changing the configuration of the crossbar switch SW through logical division while the system is in an ordinary operation.

The operations at Steps 74 and 76 shown in FIG. 7 are executed in the following manner. First, values representative of the configuration to be changed are set in the resister sets RS1 and RS2 not in use of all SW-AD 141 and SW-FC 142. In this case, in order to ensure a coincidence of the register set values between LSI's, broadcast setting may be performed. Next, data representative of an exchange instruction is written in the exchange instruction register 805. When SW-FC 142 detects the written data, it instructs suppression of all transfers using BSY and GRPBSY. With this instruction, all the transfers are suppressed in the sync state of the whole SW. Next, SW-FC 142 instructs all SW-AD to exchange the register sets, by using FCCMD. With this instruction, the register set in use is exchanged in the sync state of the whole SW, and the configuration of logical division is therefore changed. After exchanges in all SW-AD are confirmed, SW-FC 142 releases the transfer suppression to recover the ordinary operation. Up to this time, since each board of the system recognizes that SW is busy, a change in the logical division in SW will not affect the operation of each board of the system. The system can therefore change the configuration of logical division of the crossbar switch SW while the active partition operates. In the above operations, instead of using transfer suppression in a busy state, the whole SW may be made in a sync state by issuing or retrying a specific broadcast transaction. In this embodiment, the switch has two resisters RS1 and RS2 for changing the connection configuration of the switch SW. The connection configuration of the switch may be changed by using one register set. In this case, the register set values of SW at each LSI are changed by distributing the register set values by using a specific broadcast transaction or by using a system diagnosis signal line or the like while the transfer is suppressed in the sync state of the whole SW. If the whole SW is made of a single massively LSI, the sync process for the whole SW can be omitted.

Figure 9:
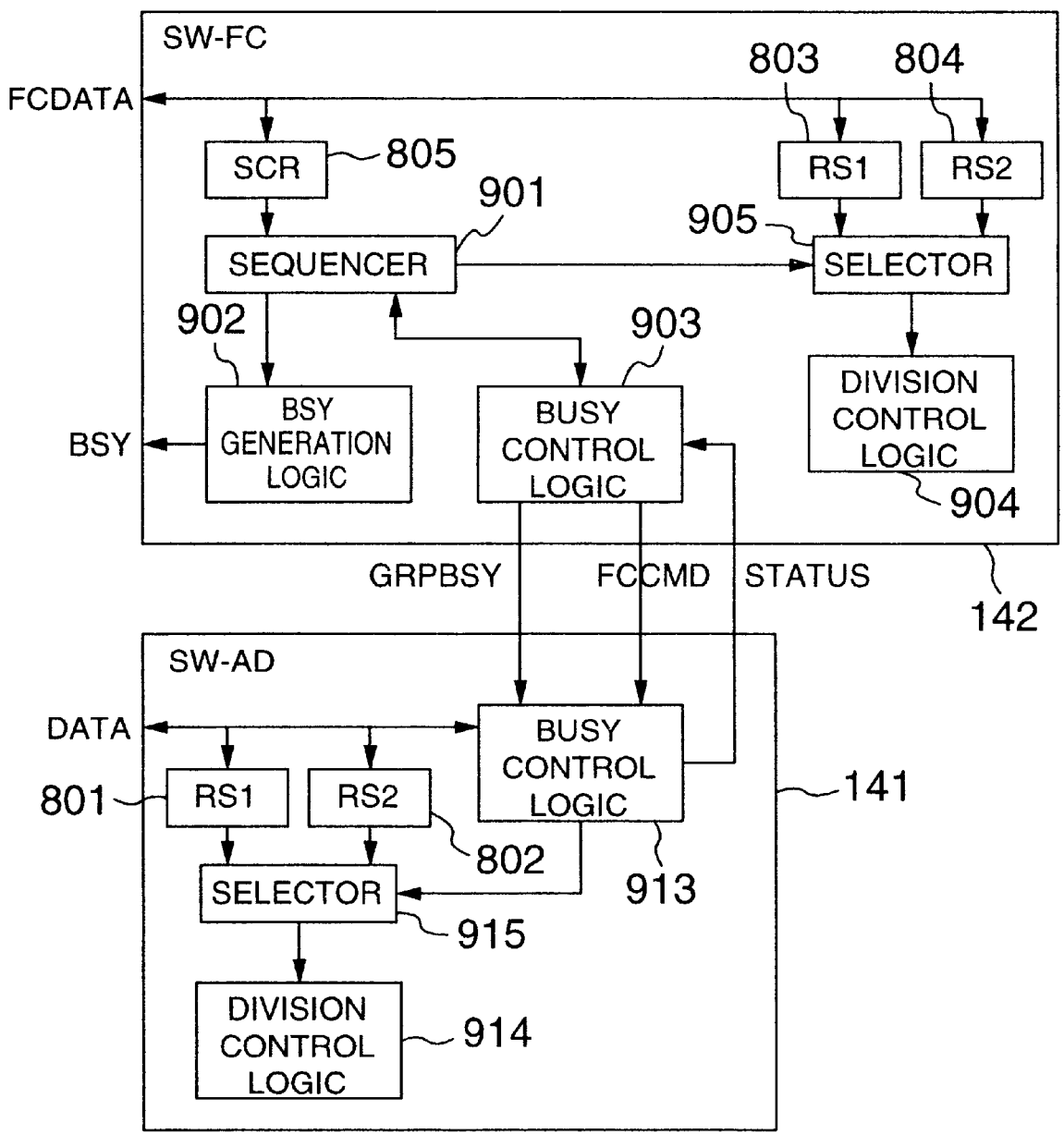
FIG. 9 shows LSI input/output signals of a crossbar switch according to the invention.

Examples of logic provided in SW-AD 141 and SW-FC 142 realizing the above operations of the invention will be described with reference to FIG. 9. These logic are essential requirements of the present invention necessary for changing the configuration of logical division of the crossbar switch SW while the system is in the ordinary operation. In FIG. 9, reference numerals 801 to 805 represent the registers described with FIG. 8, reference numeral 901 represents a sequencer, reference numeral 902 represents a BSY generation logic, reference numerals 903 and 913 represent a busy control logic, reference numerals 904 and 914 represent a division control logic, and reference numerals 905 and 915 represent a selector. Any CPU can access the registers 801 and 802 in SW-AD 141 by using DATA and the registers 803 to 805 in SW-FC 142 by using FCDATA. The BSY generation logic, busy control logic, and division control logic are similar to the logic used by a crossbar switch according to conventional techniques added with the operation functions at Steps 74 and 76 shown in FIG. 7. The division control logic 904 and 914 is selected by the selectors 905 and 915 respectively. The logical division is controlled in accordance with the register setting in either of RS1 or RS2.

Figure 10:
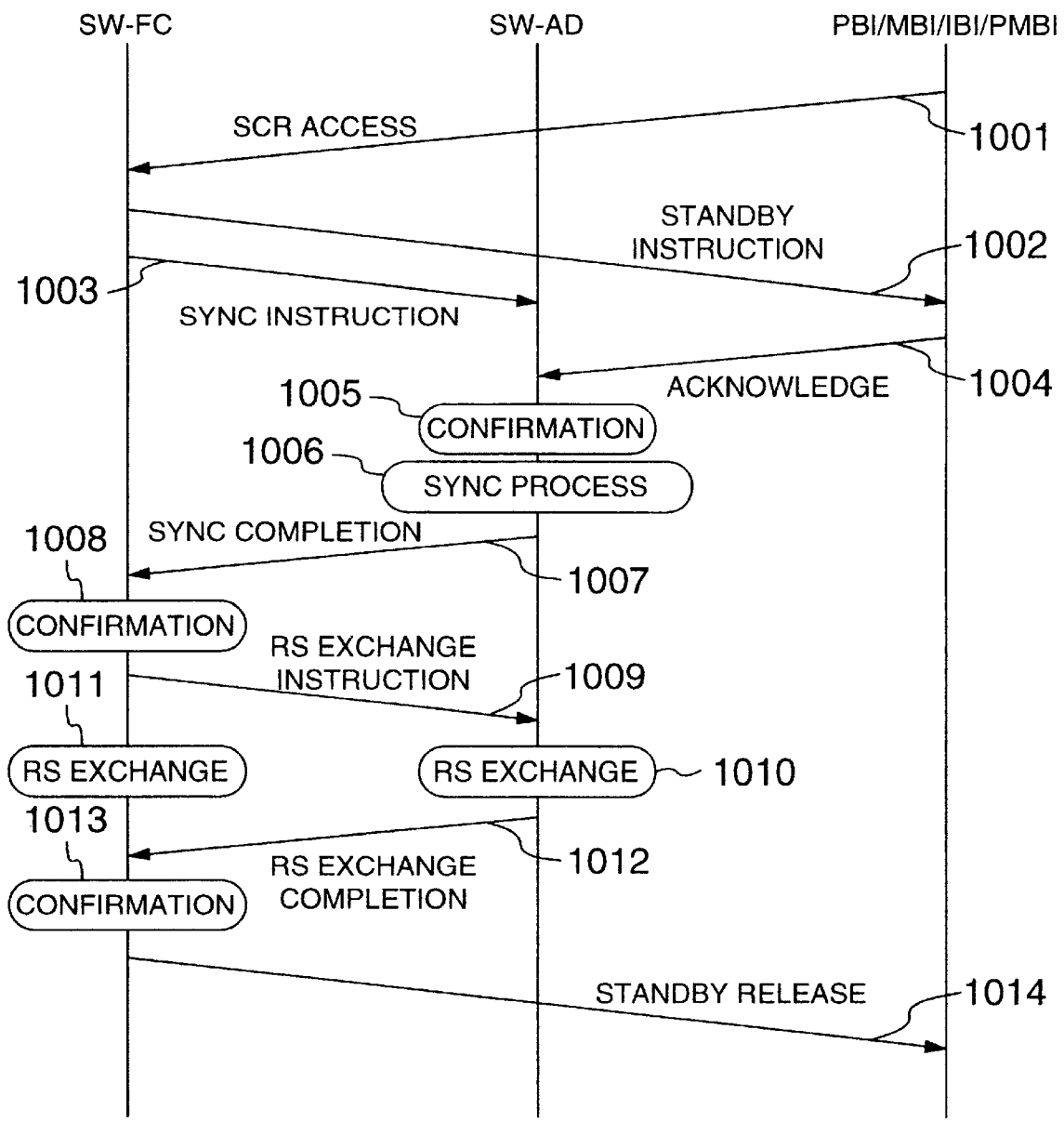
FIG. 10 is a flow chart illustrating a procedure of changing logical division of a crossbar switch according to the invention.

The sequencer 901 is used for control of the operations of Steps 74 and 76 shown in FIG. 7, and is activated upon detection of data write into the exchange instruction register 805. The operation procedure of the circuit having the structure shown in FIG. 9 will be described with reference to FIG. 10. The left portion of FIG. 10 illustrates the operation of SW-FC, the center portion illustrates the operation of SW-AD, and the right portion illustrates the operation of LSI connected to each port of the crossbar switch such as PBI, MBI, IBI, and PMBI. First, data is written in SCR 805 of SW-FC (Step 1001). Upon detection of this data write, the sequencer 902 is activated and first instructs the BSY generation logic 902 to output BSY to all ports. Upon reception of this, the BSY generation logic 902 outputs BSY to each port to thereby instruct each port to suppress a transfer and stand by (Step 1002). LSI on each port side judges that the crossbar switch is busy, and suppresses a transfer and sends back an acknowledgement to SW-AD (Step 1004). In this embodiment, it is assumed that the acknowledgement is represented by a specific pattern of DATA.

The sequencer 901 of SW-FC instructs the busy control logic 903 to output a sync instruction to all SW-AD by using GRPBSY. Upon reception of this instruction, the busy control logic 903 outputs GRPBSY to all SW-AD to instruct them to synchronize the operations between SW-AD (Step 1003). Upon reception of this instruction, the busy control logic 913 of each SW-AD confirms upon reception of the acknowledgement from each port that the transport was suppressed (Step 1005), and after all transfers under processing are made to be terminated, synchronizes the operations between SW-AD (Step 1006). After the sync operation is completed, it notifies SW-FC of such an effect by using STATUS (Step 1007). The busy control logic 903 confirms from an acknowledgement from each SW-AD that synchronization was established (Step 1008) and notifies the sequencer 901 of such an effect.

Upon reception of this, the sequencer 901 instructs the busy control logic 903 by using FCCMD to output a register set exchange command to all SW-AD. Upon reception of this, the busy control logic 903 outputs FCCMD to all SW-AD to instruct them to exchange the register set (Step 1009). Upon reception of this instruction, the busy control logic 913 changes a selection by the selector 915 to exchange the register set (Step 1010). In this manner, the division control circuit 914 changes the group division configuration. The sequencer 914 also changes a selection by the selector 905 to exchange the register set (Step 1011). In this manner, the division control circuit 904 changes the group division configuration.

After the completion of synchronization operations, the busy control logic 913 notifies SW-FC of such an effect by using STATUS (Step 1012). The busy control logic 903 confirms from an acknowledgement from each SW-AD that a change in the register set was completed (Step 1013), and notifies the sequencer 901 of such an effect. Upon reception of this, the sequencer 901 instructs the BSY generation logic 902 to release the BSY output to all ports. Upon reception of this, the BSY generation logic 902 releases the BSY output to all ports, and instructs a permission of resuming each transfer (Step 1014). LSI on the side of each port judges that the crossbar switch is not busy, and resumes each transfer.

Each board in the system recognizes that SW is busy during the period from Step 1002 to Step 1014, so that a logical division change of SW will not affect the operation of each board of the system. It is therefore possible for the system to change the configuration of logical division of the crossbar switch SE while the active partition operates.

If the scale of a partition is expanded after the completion of Step 74 shown in FIG. 7, the partition whose scale is expanded (partition B in FIG. 7) first checks the configuration of resources newly connected by the connection change at Step 74 (Step 1601). The system resources recognized at this Step were reset at Step 72 shown in FIG. 7. Next, the partition B selects and sets the recognized system resources so as to make the scale of the partition B have the scale of the active partition (Step 1602), and instructs to perform a self-diagnosis of the set target resources (Step 1603). If the system is so configured that the self-diagnosis is automatically executed when the system resources were reset, then at Step 1603 the partition B collects the results of self-diagnosis of the target resources. Instead of the self-diagnosis, the diagnosis may be performed externally.

The partition B checks the diagnosis results of the target resources (Step 1604), and if there is a resource with a detected fault (1611), the target resource are set again as many as possible (Step 1602). If there is no problem of the diagnosis results (1612), the partition B performs an initial setting of the target resources in order to include them in the partition B (Step 1605). After completion of this initial setting, the reset state is released (1606) to set up them again and include them in the partition B. In this manner, the scale expansion of a partition is completed. The above procedure is basically the same as the general procedure of expanding resources through hot swap.

Figure 11A:
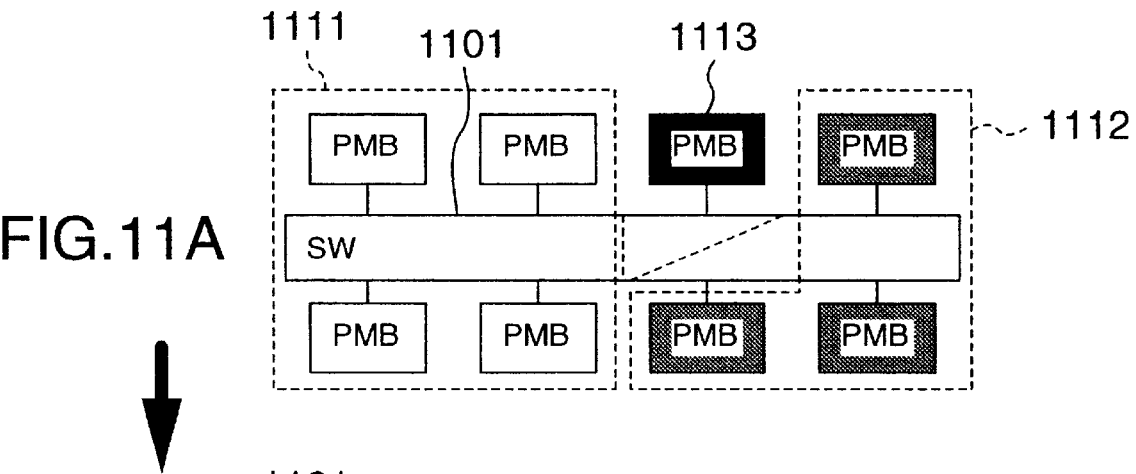
FIGS. 11A to 11C are diagrams showing a change in the configuration of a (N+1) type hot standby system of the invention during an exchange operation.

Next, an example of application of the invention to a (N+1) hot standby configuration will be described with reference to FIG. 11. FIG. 11 shows a system of the type described with FIG. 2. In FIG. 11A, SW 1101 divides the system into three groups including a first active partition 1111 constituted of four PMB's, a second active partition 1112 constituted of three PMB's and a standby partition 1113 constituted of one PMB. In FIG. 11A, hard disks, a network, and the like are shown omitted and it is assumed these constituents can be accessed from all PMB's by a general means such as fiber channel connection.

Figure 11B:
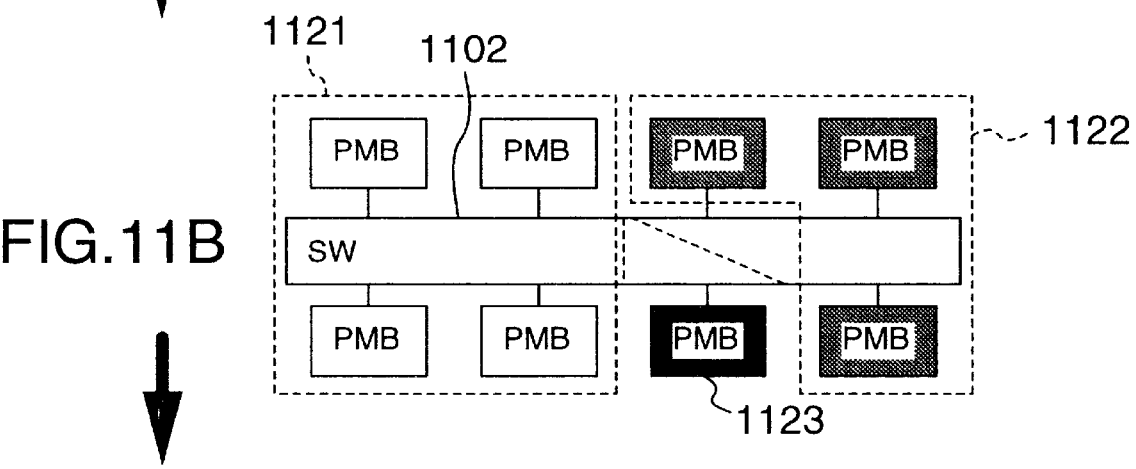

When a fault occurs in the partition 1112 shown in FIG. 11A, a partition exchange is performed between the partition 1112 and partition 1113 and the system changes its state to that shown in FIG. 11B by using the procedure shown in FIG. 7. In FIG. 11B, reference numeral 1112 represents a first active state, reference numeral 1121 represents a second active partition, and reference numeral 1123 represents a standby partition. During this state change, although the logical division of SW changes from 1101 to 1102, the division of the active partition 1 does not change and the active partition 1 is not influenced at all.

Figure 11C:
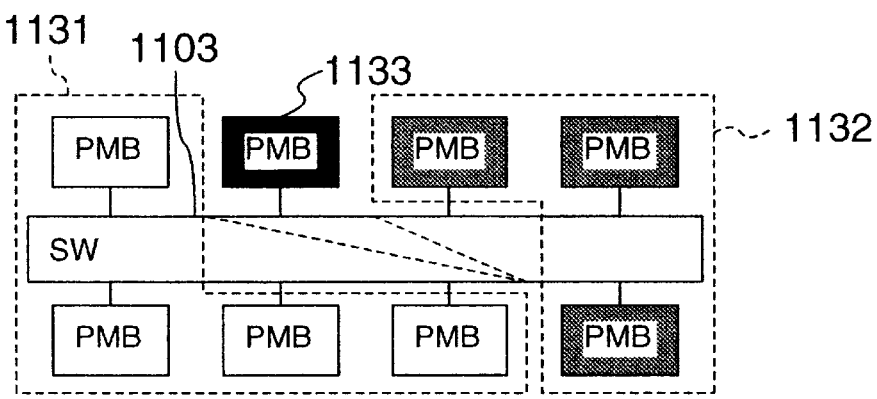

When a fault further occurs in the partition 1121 shown in FIG. 11B, a partition exchange is performed between the partition 1121 and partition 1123 and the system changes its state to that shown in FIG. 11C by using the procedure shown in FIG. 7. In FIG. 11C, reference numeral 1131 represents a first active state, reference numeral 1132 represents a second active partition, and reference numeral 1133 represents a standby partition. During this state change, although the logical division of SW changes from 1102 to 1103, the division of the active partition 2 does not change and the active partition 2 is not influenced at all.

As above, according to the present invention, with the (N+1) hot standby configuration, the system reliability is improved to a level capable of exchanging the active partition with a standby partition of a scale equal to that of the active partition when a fault occurs in the active partition, while an increase in the cost is suppressed.

Figure 13:
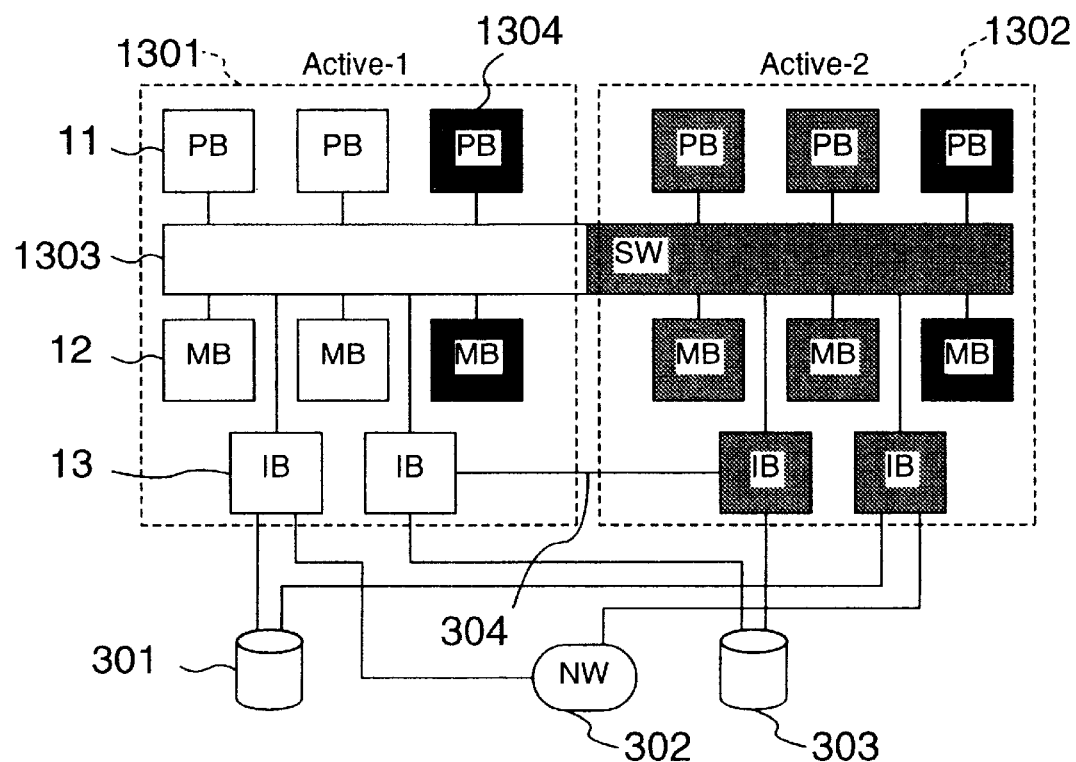
FIG. 13 is a diagram showing the configuration of a mutual hot standby system obtained during a course the invention was realized.

Next, with reference to FIGS. 13 and 14, an example of application of the invention to a mutual hot standby system will be described. FIG. 13 shows an example of the configuration of a mutual hot standby system obtained during a course the present invention was realized. In the mutual hot standby system, two active partition groups 1301 and 1302 operate serving as a standby partition for each group. In the two active groups shown in FIG. 13, each group is constituted of three PB's 11, three MB's 12 and two IB's 13 respectively connected by SW 14. Of these, one PB and one MB are standby system resources of each group and are provided from the reason to be described later. The two groups are both connected to a first active partition hard disk 301, a network 302 and a second active partition hard disk 303. The two groups are connected by an intersystem connection interface 304. The intersystem connection interface 304 is used for transfer of a beak message, a system reset instruction, a reboot instruction or the like, similar to that described with FIG. 3.

During an ordinary operation, the first active partition 1301 operates by using the hard disk 301 and network 302, whereas the second active partition 1302 operates by using the hard disk 1302 and network 302. The partition 1301 and 1302 transfer the heartbeat message therebetween by using the intersystem connection interface 304 to monitor each other the operation state.

When a fault occurs in the partition 1301 and the partition 1302 detects this from a halt of the heartbeat message, an abnormal state notice, or the like, the partition 1302 sends a system reset command to the partition 1301 which is then reset. After the partition 1301 is reset and the hard disk 301 and network 302 are disconnected from the partition 1301, the partition 1302 is connected to the hard disk 301 and operates serving as the two active partition. In this case, there is a possibility of an overload so that the above-described standby system resources are provided to be used serving as the two active partition.

Thereafter, the partition 1301 is rebooted to perform a self-diagnosis and necessary repairs, and thereafter the partition 1301 becomes again the active partition through a general turn over process. If a fault occurs in the partition 1302, the operations symmetrical to the above-described operations are performed for the partition 1301 and 1302. From the above reason, the standby system resources are required to be provided for both the partition 1301 and 1302 according to conventional techniques.

Figure 14A:
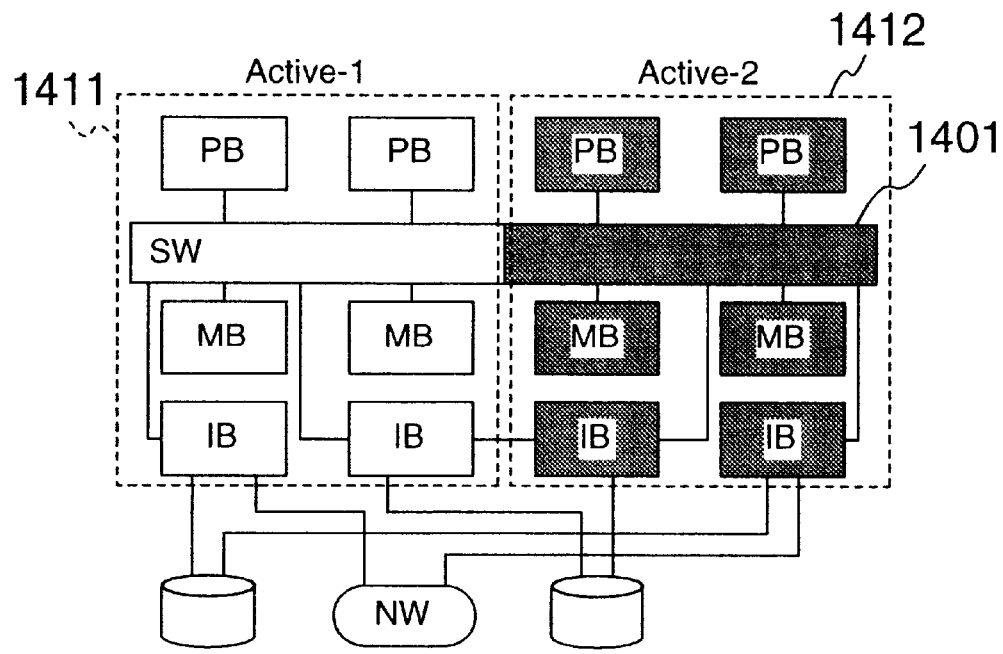
FIGS. 14A and 14B are diagrams showing the configuration of a mutual hot standby system of the invention.

FIG. 14 shows the configuration of a mutual hot standby system according to the invention. In FIG. 14A, two active partition groups 1411 and 1412 operate serving as a standby partition for each group. In the two active groups shown in FIG. 14, each group is constituted of two PB's 11, two MB's 12 and two IB's 13 respectively connected by SW 14. Standby system resources are not provided.

When a fault occurs in the partition 1411 and the partition 1412 detects this from a halt of the heartbeat message, an abnormal state notice, or the like, the partition 1412 sends a system reset command to the partition 1411 which is then reset. After the partition 1411 is reset, the partition 1412 operates serving as the two active partition. In this case, SW 1401 of the invention changes the group configuration of logical division while the partition 1412 operates, and the system changes its state to that shown in FIG. 14B.

Figure 14B:
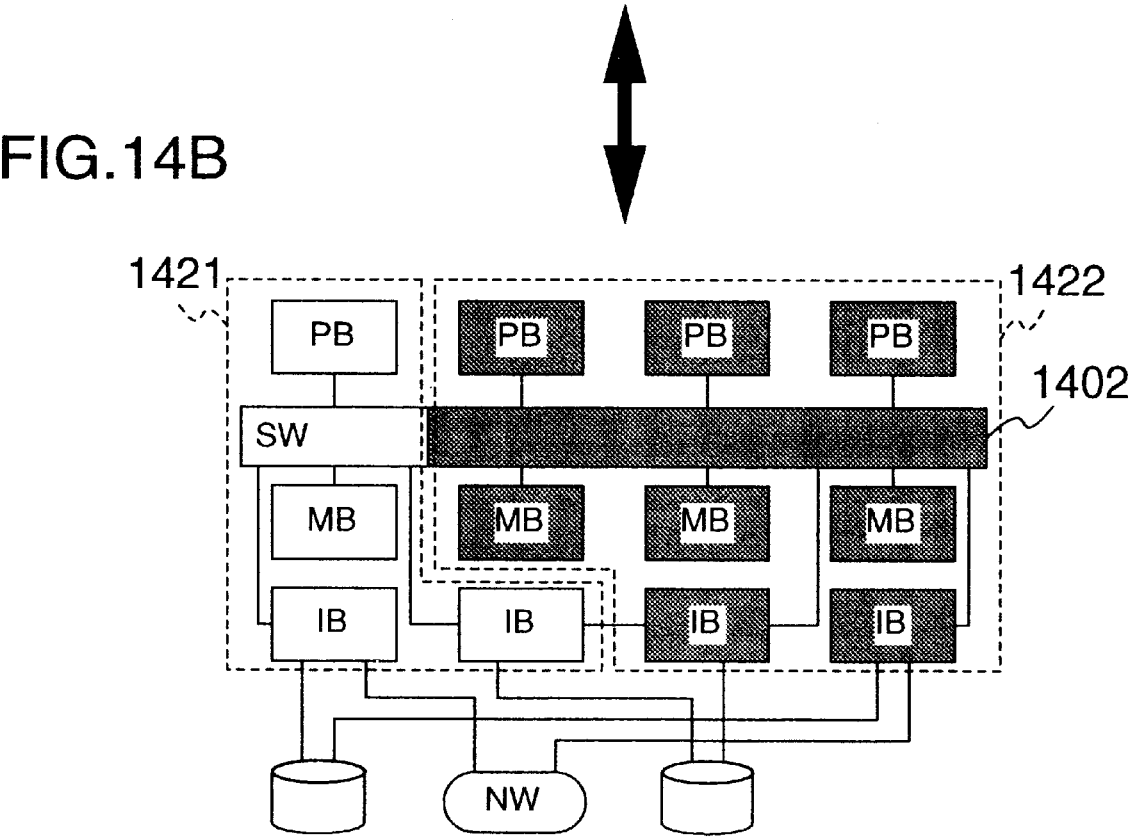

In this state shown in FIG. 14B, SW 1402 connects the system in such a manner that the partition 1412 is expanded as a partition 1422 and the partition 1411 is contracted as a partition 1421. The partition 1422 diagnoses reset PB and MB included in the expanded portion, and if there is no problem, they are included in the partition 1422. In this manner, the partition 1422 operates serving as the two active partition, with a performance equal to the partition 1302 shown in FIG. 13. Thereafter, the partition 1421 is rebooted to perform a self-diagnosis and necessary repairs, and thereafter the partition 1421 becomes again the active partition through a turn over process. In this turn over process, the partition 1422 abandons the expanded portion and is reset. Thereafter, SW changes its connection state from 1402 to 1401 and the whole system recovers the state shown in FIG. 14A.

As compared to the system shown in FIG. 13, standby system resources are not necessary for the two partition shown in FIG. 14, whereas the standby system resources are provided for both the two partition shown in FIG. 13. Accordingly, it is possible to improve the system reliability to a level equal to the system shown in FIG. 13 while an increase in the cost is suppressed. Obviously, the example shown in FIG. 14 can be applied easily to a system having three or more active partition groups.

Figure 15A:
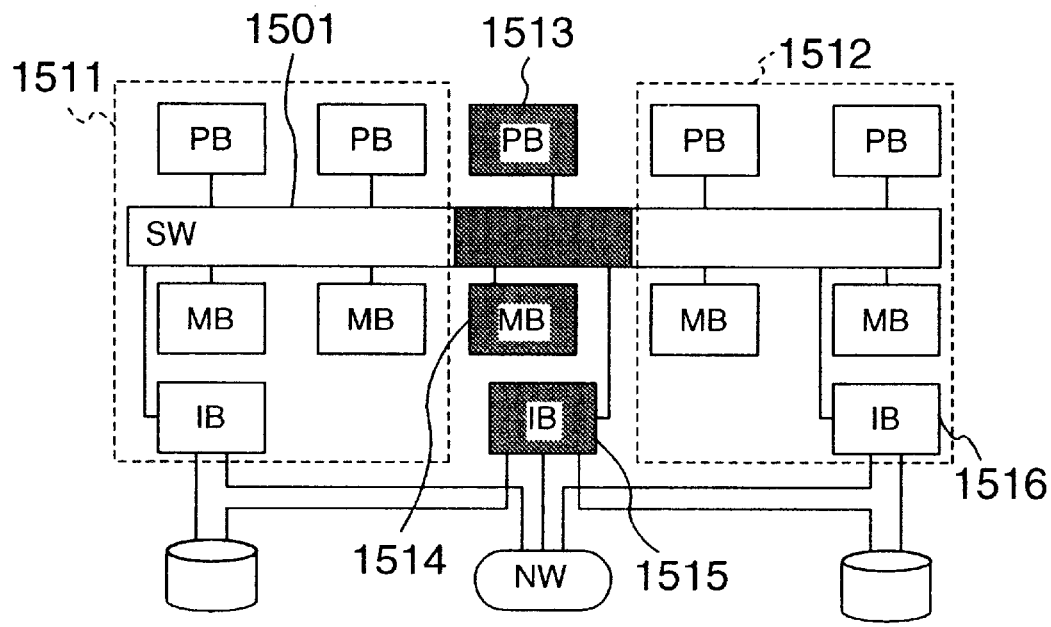
FIGS. 15A and 15B are diagrams showing the configuration of a system having standby system resources according to the invention.

Next, with reference to FIG. 15, an example of application of the invention to a system having standby system resources will be described. The system shown in FIG. 15A has a first group 1511, a second group 1512, and standby system resources not belonging to any group and including PB 1513, MB 1514, and IB 1515, respectively connected to SW 1501. It is assumed that IB 1515 is connected to all hard disks and a network connected to the two groups 1511 and 1512.

Figure 15B:
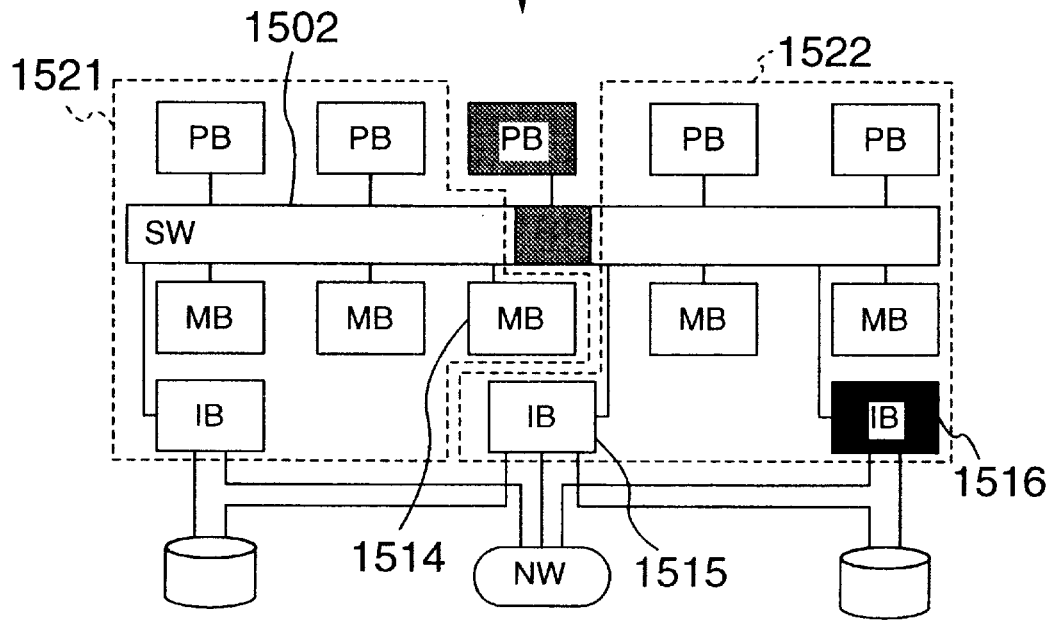
Figure 16:
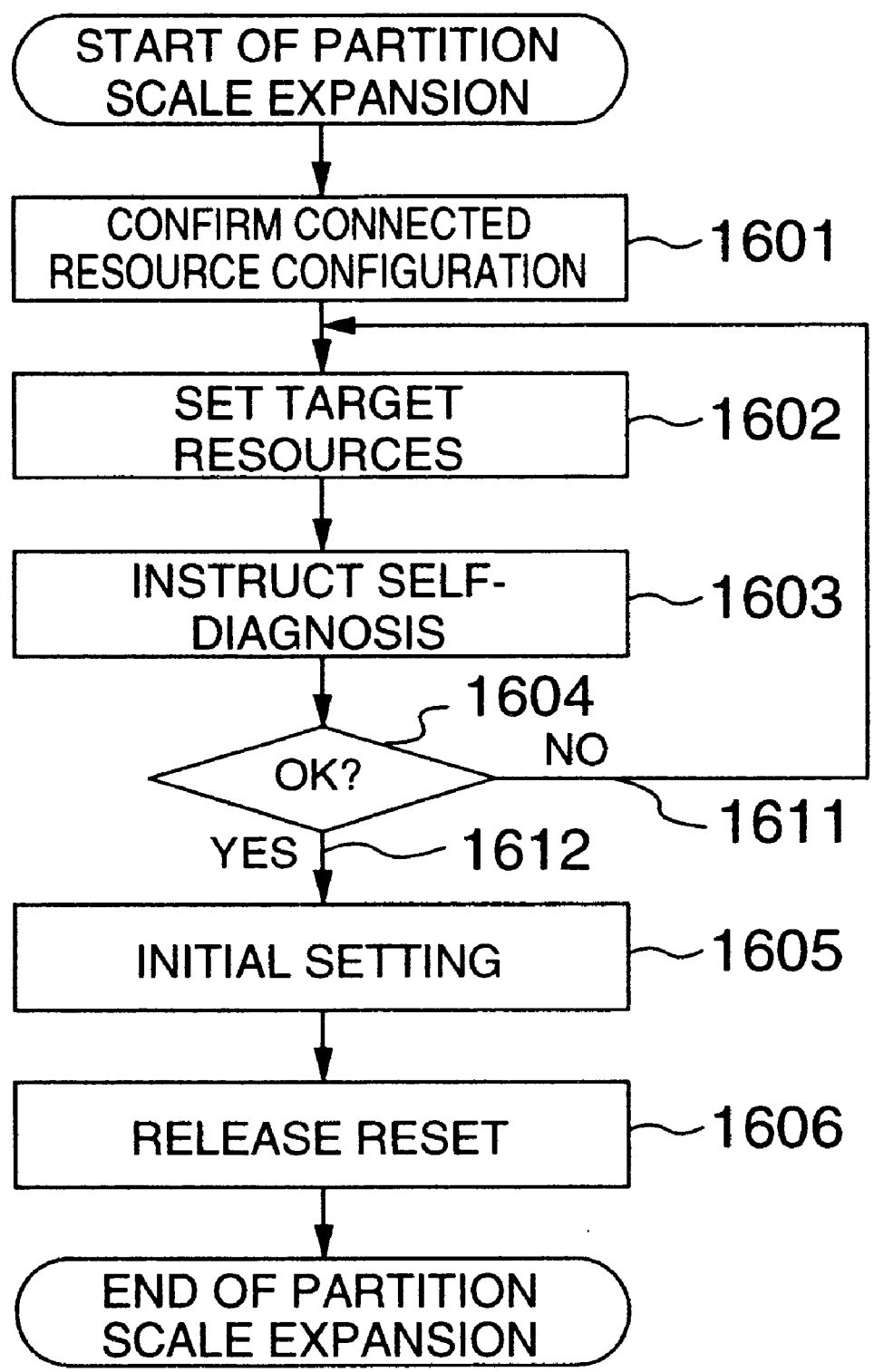
FIG. 16 is a flow chart illustrating a procedure of expanding a scale of a partition according to the invention.

When a fault occurs in IB 1516 of the group 1512, the group 1512 can include the standby IB 1515 therein to replace IB 1516 with it, because the system of the invention can change the group division configuration while the system is in the ordinary operation. When a memory load of the group 1511 becomes excessive temporarily or periodically, the group 1511 can include the standby MB 1514 when necessary to overcome the excessive load, because the system of the invention can change the group division configuration while the system is in the ordinary operation. Allocation of such standby system resources is illustrated in FIG. 15B. In the state shown in FIG. 15B, when IB 1516 of the group 1522 recovers a normal performance by repairs or replacements or when the memory load of the group 1521 recovers a normal condition, the system can take again the state shown in FIG. 15A.

As described so far, according to the present invention, the system can change the group division configuration while the system in the ordinary operation. Accordingly, the system can provide standby system resources not belonging to any group, and an arbitrary group can include the standby system resources therein by changing the group division configuration when necessary. According to conventional techniques, it is necessary to provide standby system resources in each of a plurality of groups to form the configuration such as shown in FIG. 13. According to the present invention, however, in the system having a plurality of groups, the system can provide standby system resources capable of being included in an arbitrary group. Accordingly, the system can provide standby system resources while an increase in the cost is suppressed.

In the above description, embodiments of a hot standby configuration having active and standby partition have been given. It is obvious that the invention is also applicable to other configurations other than the hot standby configuration. For example, the group division configuration may be changed by using the procedure described with the embodiments, in such a manner that system resources are transferred from a group having light load and surplus system resources to a group having heavy load.

What is claimed is:

1. An information processing apparatus having a plurality of processors and a plurality of memories connected by a switch, the switch comprising:

data transfer control means for intercepting data transfer in the switch and outputting a switch changing signal for changing a connection of the switch, upon reception of a switch connection information regarding the connection of the switch;

switch control means responsive to an output of the switch changing signal for changing a switch connection in accordance with the switch connection information, wherein when the switch connection information changes a configuration of the plurality of processors and the plurality of memories of the information processing apparatus so that operations of the information processing apparatus are not interrupted and the information processing apparatus does not require re-booting.

2. An information processing apparatus according to claim 1, further comprising both an active partition system and a standby partition system, and changing means for changing a division configuration of the systems, by including a system resource used by the active partition system in the standby system while the information processing apparatus is in an ordinary operation, when the standby partition system is switched to the active partition system because of a fault of the active partition.

3. An information processing apparatus according to claim 2, further comprising a storage device for storing information necessary when the standby partition system is switched to the active partition system because of a fault of the active partition, said storage device being accessible by both the active partition system and the standby partition system.

4. An information processing apparatus according to claim 1, further comprising setting means for setting a shared device accessible by a plurality of systems in the system configuration.

5. An information processing apparatus according to claim 4, wherein the shared system resource use a semiconductor memory.

6. An information processing apparatus according to claim 1, further comprising a system resource capable of being included in any one of the plurality of systems.

7. An information processing apparatus according to claim 1, wherein said plurality of processors are divided into two groups respectively controlled by said switch control means and said data transfer control means.

8. An information processing apparatus having a plurality of processors and a crossbar switch for connecting the plurality of processors, the crossbar switch comprising:
   division control means for controlling division of the plurality of processors into a plurality of groups, said division control means further comprising:
      a first division control unit for changing a division configuration of the switch in accordance with switch connection information; and
      a second division control unit for changing the division configuration of the switch upon reception of a switch changing signal;
   a register for storing a division configuration of the variety of processors determined by said division control means;
   intercepting means for intercepting data transfer synchronously with a whole of the crossbar switch;
   changing means for changing a setting of the division configuration of the plurality of processors stored in said register when the data transfer is intercepted by said intercepting means; and
   releasing means for releasing the interruption of the data transfer detected by said intercepting means, wherein said changing means changes in a setting the division configuration of the plurality of processors of the information processing apparatus so that operations of the information processing apparatus are not interrupted and the information processing apparatus does not require re-booting the information processing apparatus.

9. An information processing apparatus according to claim 8, further comprising means for configuring a mutual hot standby system having a plurality of partition serving both an active partition and a standby partition other than the active partition.

10. A switch control method for data transfer via a switch between a plurality of processors and a plurality of memories, the method comprising the steps of:
   intercepting data transfers in the switch upon reception of a switch connection information regarding a connection of the switch;
   outputting a switch changing signal for changing a switch connection; and
   changing the switch connection in accordance with the switch connection information, upon an output of the switch changing signal, wherein, when the switch connection information changes a configuration of the plurality of processors and the plurality of memories of the information processing apparatus so that operations of the information processing apparatus is not interrupted and the information processing apparatus does not require rebooting.

11. A switch method according to claim 10, wherein the information processing apparatus further comprises both an active partition system and a standby partition system, and the switch control method changes a division configuration of the systems, by including a system resource used by the active partition system in the standby system while the information processing apparatus is in an ordinary operation, when the standby partition system is switched to the active partition system because of a fault of the active partition.

12. A switch control method according to claim 11, further comprising a step of storing information necessary when the standby partition system is switched to the active partition system because of a fault of the active partition, the stored information being accessible by both the active partition system and the standby partition system.

13. A switch control method according to claim 10, further comprising a step of setting a shared device accessible by a plurality of systems in the system configuration.

14. A switch control method according to claim 10, wherein a system resource in the information processing apparatus is capable of being included in any one of the plurality of systems.

15. A switch control method according to claim 10, further comprising a step of dividing said plurality of processors into two groups to be intercepted with said data transfer.

16. A switch control method for an information processing apparatus having a plurality of processors and a crossbar switch for connecting the plurality of processors, the method comprising the steps of:
   controlling to divide the plurality of processors into a plurality of groups;
   storing a division configuration of the plurality of processors;
   intercepting data transfer synchronously with a whole of the crossbar switch;
   changing a setting of the stored division configuration of the plurality of processors when the data transfer is intercepted; and
   releasing the interruption of the data transfer when the division configuration of the plurality of processors is changed so that the division configuration of the plurality of processors of the information processing apparatus does not interrupt the operation of the information processing apparatus re-booting of the information processing apparatus is not required.

17. An information processing apparatus having a plurality of processors and a plurality of memories connected via a switch having a function control circuit and a switching circuit connected to the function control circuit, the function control circuit comprising:
   a first data transfer control circuit for outputting a signal for intercepting data transfer in the switch and a switch changing signal for changing a connection of the switch, upon reception of switch connection information regarding the connection of the switch; and
   a first division control circuit for changing a division configuration of the switch in accordance with the switch connection information so that the division configuration of the plurality of processors of the information processing apparatus does not interrupt the operation of the information processing apparatus re-booting and the information processing apparatus is not required.

18. An information processing apparatus according to claim 17, wherein the switching circuit comprises:
a second data transfer control circuit responsive to the signal for intercepting the data transfer for transmitting a completion of an interruption to the function control circuit when the interruption of the data transfer is completed; and
a second division control circuit for changing the division configuration of the switch upon reception of the switch changing signal.

19. An information processing apparatus according to claim 17, wherein said plurality of processors are divided into two groups respectively controlled by said first data transfer control circuit and said first division control circuit.

20. An information processing apparatus, comprising:
a plurality of processor boards, wherein each processor board of the plurality of processors boards has at least one processor;
a plurality of memory boards each having memory to store data;
a plurality of input/output boards to communicate to peripheral devices, wherein at least one of the plurality of processor boards, memory boards and input/output boards are designated as active systems and at least one of the plurality of processor boards, memory boards and input/output boards are designated as stand-by systems; and
a crossbar switch connected to the plurality of processor boards, the plurality of memory boards and the plurality of input/output boards to transfer data between and plurality of processor boards, the plurality of memory boards and the plurality of input/output boards, said crossbar switch further comprising:
a plurality of registers forming a plurality of registers sets having information indicative of the configuration of the active and stand-by systems;
a plurality of busy control logic units to signal the plurality of processor boards that the crossbar switch is busy and not accepting or transmitting data;
a plurality of division control logic units to change the configuration of the active and stand-by systems in the plurality of register sets; and
a sequencer connected to the plurality of registers, busy control logic units, and division control logic units to receive a signal indicative of a failure in a component of an active system, activate the plurality of busy control logic units, activate the plurality of division control logic units to change the configuration of the active and stand-by systems, and to deactivate the plurality of busy control logic units, wherein the failed component of the active system may be replaced with a standby system without re-booting the information processing apparatus and while the information processing apparatus is performing normal operations.

21. The information processing apparatus recited in claim 20, wherein the crossbar switch further comprises:
a selector connected to each division control logic unit of the plurality of division control logic units to select a register set of the plurality of register sets.

22. The information processing apparatus recited in claim 21, wherein when the failed component of the active system is replaced by the stand-by system the failed component is re-booted and diagnostics are executed to check the memory board, processor board, and the input/output board of the failed component.

23. The information processing apparatus recited in claim 22, wherein when either the memory board, processor board, or the input/output board of the failed component pass diagnostics, the passed memory board, processor board, or the input/output board are added to a register of the register set indicative of active systems.

24. A crossbar switch connected to an active system and a stand-by system, comprising:
a plurality of registers forming a plurality of registers sets having information indicative of the configuration of the active and stand-by systems;
a plurality of busy control logic units to signal a plurality of processor boards in the active system that the crossbar switch is busy and not accepting or transmitting data;
a plurality of division control logic units to change the configuration of the active and stand-by systems in the plurality of register sets; and
a sequencer connected to the plurality of registers, busy control logic units, and division control logic units to receive a signal indicative of a failure in a component of an active system, activate the plurality of busy control logic units, activate the plurality of division control logic units to change the configuration of the active and stand-by systems, and to deactivate the plurality of busy control logic units, wherein the failed component of the active system may be replaced with a standby system without rebooting the information processing apparatus and while the information processing apparatus is performing normal operations.

25. The crossbar switch recited in claim 24, wherein the crossbar switch further comprises:
a selector connected to each division control logic unit of the plurality of division control logic units to select a register set of the plurality of register sets.

26. The crossbar switch recited in claim 25, wherein when the failed component of the active system is replaced by the stand-by system the failed component is re-booted and diagnostics are executed to check the failed component.

27. The crossbar switch recited in claim 26, wherein when the failed component passes diagnostics the failed component is added to a register of the register set indicative of active systems.

* * * * *